United States Patent
Zhang et al.

(10) Patent No.: US 12,301,863 B2
(45) Date of Patent: *May 13, 2025

(54) AFFINE PREDICTION IN VIDEO CODING

(71) Applicant: QUALCOMM Incorporated, San Diego, CA (US)

(72) Inventors: Kai Zhang, San Diego, CA (US); Jianle Chen, San Diego, CA (US); Xin Zhao, Santa Clara, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/534,336

(22) Filed: Dec. 8, 2023

(65) Prior Publication Data
US 2024/0137556 A1 Apr. 25, 2024

Related U.S. Application Data

(63) Continuation of application No. 16/155,744, filed on Oct. 9, 2018, now Pat. No. 11,877,001.
(Continued)

(51) Int. Cl.
*H04N 19/52* (2014.01)
*H04N 19/109* (2014.01)
(Continued)

(52) U.S. Cl.
CPC .......... *H04N 19/52* (2014.11); *H04N 19/109* (2014.11); *H04N 19/147* (2014.11);
(Continued)

(58) Field of Classification Search
CPC .... H04N 19/52; H04N 19/109; H04N 19/147; H04N 19/174; H04N 19/176;
(Continued)

(56) References Cited

U.S. PATENT DOCUMENTS

| | | | |
|---|---|---|---|
| 5,654,771 A * | 8/1997 | Tekalp | H04N 19/54 382/241 |
| 6,404,815 B1 | 6/2002 | Sekiguchi et al. | |

(Continued)

FOREIGN PATENT DOCUMENTS

| | | |
|---|---|---|
| CN | 102893608 A | 1/2013 |
| CN | 106537915 A | 3/2017 |

(Continued)

OTHER PUBLICATIONS

Advisory Action for U.S. Appl. No. 16/735,475, mailed Apr. 8, 2021, 3 pages.
(Continued)

*Primary Examiner* — Rebecca A Volentine
*Assistant Examiner* — Jimmy S Lee
(74) *Attorney, Agent, or Firm* — Shumaker & Sieffert, P.A.

(57) ABSTRACT

A device for video decoding can be configured to obtain, from a syntax structure in a bitstream comprising an encoded representation of the video data, a syntax element indicating whether 6-parameter affine prediction is enabled for blocks corresponding to the syntax structure, wherein the blocks corresponding to the syntax structure comprise a first block; based on the syntax element indicating that the 6-parameter affine prediction is enabled for the blocks corresponding to the syntax structure, use the 6-parameter affine prediction to generate a predictive block for the first block; and use the predictive block and residual data to reconstruct the first block.

13 Claims, 15 Drawing Sheets

Related U.S. Application Data

(60) Provisional application No. 62/570,417, filed on Oct. 10, 2017.

(51) Int. Cl.
*H04N 19/147* (2014.01)
*H04N 19/174* (2014.01)
*H04N 19/176* (2014.01)
*H04N 19/184* (2014.01)
*H04N 19/54* (2014.01)
*H04N 19/70* (2014.01)
*H04N 19/96* (2014.01)

(52) U.S. Cl.
CPC ......... *H04N 19/174* (2014.11); *H04N 19/176* (2014.11); *H04N 19/184* (2014.11); *H04N 19/54* (2014.11); *H04N 19/70* (2014.11); *H04N 19/96* (2014.11)

(58) Field of Classification Search
CPC ...... H04N 19/184; H04N 19/54; H04N 19/70; H04N 19/96
USPC ...................................... 375/240.12
See application file for complete search history.

(56) References Cited

U.S. PATENT DOCUMENTS

| | | |
|---|---|---|
| 6,711,209 B1 | 3/2004 | Lainema et al. |
| 6,711,211 B1 | 3/2004 | Lainema et al. |
| 6,738,423 B1 | 5/2004 | Lainema et al. |
| 9,282,338 B2 | 3/2016 | Zheng et al. |
| 9,736,498 B2 | 8/2017 | Lin et al. |
| 10,448,010 B2 | 10/2019 | Chen et al. |
| 10,560,712 B2 | 2/2020 | Zou et al. |
| 10,798,403 B2 | 10/2020 | Ikai et al. |
| 10,827,194 B2 | 11/2020 | Li et al. |
| 11,877,001 B2 * | 1/2024 | Zhang ............ H04N 19/174 |
| 2002/0034250 A1 | 3/2002 | Yoo et al. |
| 2006/0067585 A1 | 3/2006 | Pace et al. |
| 2008/0240247 A1 | 10/2008 | Lee et al. |
| 2011/0090960 A1 | 4/2011 | Leontaris et al. |
| 2011/0103480 A1 | 5/2011 | Dane |
| 2012/0177120 A1 | 7/2012 | Guo et al. |
| 2013/0039422 A1 * | 2/2013 | Kirchhoffer ............ H04N 19/96 375/E7.188 |
| 2013/0121416 A1 | 5/2013 | He et al. |
| 2013/0128974 A1 | 5/2013 | Chien et al. |
| 2013/0272403 A1 | 10/2013 | Ramasubramonian et al. |
| 2013/0287116 A1 | 10/2013 | Helle et al. |
| 2013/0322531 A1 | 12/2013 | Chen et al. |
| 2014/0192862 A1 * | 7/2014 | Flynn ............ H04N 19/117 375/240.03 |
| 2014/0362911 A1 | 12/2014 | Puri |
| 2016/0227227 A1 * | 8/2016 | Deshpande .......... H04N 19/157 |
| 2017/0013279 A1 | 1/2017 | Puri et al. |
| 2017/0054996 A1 | 2/2017 | Xu et al. |
| 2017/0085917 A1 | 3/2017 | Hannuksela |
| 2017/0188041 A1 * | 6/2017 | Li ..................... H04N 19/182 |
| 2017/0195685 A1 | 7/2017 | Chen et al. |
| 2017/0214932 A1 | 7/2017 | Huang |
| 2017/0280162 A1 | 9/2017 | Zhao et al. |
| 2017/0332095 A1 | 11/2017 | Zou et al. |
| 2017/0339425 A1 | 11/2017 | Jeong et al. |
| 2018/0098063 A1 | 4/2018 | Chen et al. |
| 2018/0309990 A1 | 10/2018 | Alshina et al. |
| 2018/0352247 A1 | 12/2018 | Park et al. |
| 2019/0028731 A1 | 1/2019 | Chuang et al. |
| 2019/0098312 A1 | 3/2019 | Chen et al. |
| 2019/0110064 A1 | 4/2019 | Zhang et al. |
| 2020/0045310 A1 | 2/2020 | Chen et al. |
| 2020/0145688 A1 | 5/2020 | Zou et al. |

FOREIGN PATENT DOCUMENTS

| | | |
|---|---|---|
| JP | 2012080151 A | 4/2012 |
| JP | 2018511997 A | 4/2018 |
| KR | 20000011096 A | 2/2000 |
| KR | 20060107864 A | 10/2006 |
| RU | 2011102033 A | 7/2012 |
| WO | 2011013253 A1 | 2/2011 |
| WO | 2012099438 A2 | 7/2012 |
| WO | 2016008408 A1 | 1/2016 |
| WO | 2016050051 A1 | 4/2016 |
| WO | 2017087751 A1 | 5/2017 |
| WO | 2017118411 A1 | 7/2017 |
| WO | 2017130696 A1 | 8/2017 |
| WO | 2017157259 A1 | 9/2017 |
| WO | 2017200771 | 11/2017 |
| WO | 2019075058 A1 | 4/2019 |

OTHER PUBLICATIONS

Applicant Initiated Interview Summary (PTOL-413) for U.S. Appl. No. 01/163,472 through Jul. 5, 2019, 3 Pages.

Boyce J., et al., "JVET Common Test Conditions and Software Reference Configurations", JVET-J1010-v1, Joint Video Experts Team (JVET) of ITU-T SG 16 WP 3 and ISO/IEC JTC 1/SC 29/WG 11, 10th Meeting, San Diego, US, Apr. 10-20, 2018, pp. 1-4.

Bross B., et al., "High Efficiency Video Coding (HEVC) Text Specification Draft 10 (for FDIS & Last Call)", 12th Meeting, Geneva, CH, Jan. 14-23, 2013, (Joint Collaborative Team on Video Coding of ISO/IEC JTC 1/SC 29/WG 11 and ITU-T SG 16 WP 3), JCTVC-L1003_v34, Mar. 19, 2013, 310 pages, please consider section 8.5.3.2.5 on pp. 124 and 125, section 8.5.3.2.6 on pp. 125-128, and section 8.5.3.2.7 on pp. 128 and 129.

Bross B., et al., "Versatile Video Coding (Draft 1)", JVET-J1001-v2, Joint Video Experts Team (JVET) of ITU-T SG 16 WP 3 and ISO/IEC JTC 1/SC 29/WG 11, 10th Meeting, Apr. 2018, JVET-J1001-v2, 43 pages.

Chen J., et al., "Algorithm Description of Joint Exploration Test Model 1", Joint Video Exploration Team (JVET) of ITU-T SG 16 WP 3 and ISO/IEC JTC 1/SC 29/WG 11, 1st Meeting: Geneva, CH, Oct. 19-21, 2015, No. H.266, JVET-A1001, Feb. 24, 2016 (Feb. 24, 2016), XP030150000, 27 Pages, URL: http://phenix.int-evry.fr/jvet/.

Chen J., et al., "Algorithm Description of Joint Exploration Test Model 2", Joint Video Exploration Team (JVET) of ITU-T SG 16 WP 3 and ISO/IEC JTC 1/SC 29/WG 11, 2nd Meeting, San Diego, CA, USA, Feb. 20-26, 2016, [JVET-B1001_v3], Mar. 25, 2016 (Mar. 25, 2016), 32 Pages, JVET-B1001 (version 3), pp. 6-7.

Chen J., et al., "Algorithm Description of Joint Exploration Test Model 2", Joint Video Exploration Team (JVET) of ITU-T SG 16 WP 3 and ISO/IEC JTC 1/SC 29/WG 11, 2nd Meeting, San Diego, USA, Document No. JVET-B1001_v1, Feb. 20-26, 2016, 31 Pages, XP030150091, Aug. 3, 2016.

Chen J., et al., "Algorithm Description of Joint Exploration Test Model 2," Joint Video Exploration Team (JVET) of ITU-T SG 16 WP 3 and ISO/IEC JTC 1/SC 29/WG 11, 2nd Meeting: San Diego, USA, Feb. 20-26, 2016, JVET-B1001, Mar. 25, 2016, 32 pages.

Chen J., et al., "Algorithm Description of Joint Exploration Test Model 3", Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 Pages, Jul. 6, 2016, section 2-2.2.1.

Chen J., et al., "Algorithm Description of Joint Exploration Test Model 4," Joint Video Exploration Team (JVET) of ITU-T SG 16 WP 3 and ISO/IEC JTC 1/SC 29/WG 11, 4th Meeting: Chengdu, Oct. 15-21, 2016, JVET-D1001-v3, 39 pp.

Chen J., et al., "Algorithm Description of Joint Exploration Test Model 5 (JEM 5)", Joint Video Exploration Team (JVET) of ITU-T SG 16 WP 3 and ISO/IEC JTC 1/SC 29/WG 11, 5th Meeting, Geneva, CH, Jan. 12-20, 2017, 44 Pages, Feb. 11, 2017 (Feb. 11, 2017), XP030150648, Jan. 12, 2014, section 2.2.1.1, section: 2.3.8 Bi-directional optical flow section "2.3.9. decoder-side motion vector refinement".

(56) References Cited

OTHER PUBLICATIONS

Chen J., et al., "Algorithm Description of Joint Exploration Test Model 7 (JEM7)", 119. MPEG Meeting, 7. JVET Meeting, Jul. 13, 2017-Jul. 21, 2017, JVET-G1001-V1, Joint Video Exploration Team (JVET) of ITU-T SG 16 WP3 and ISO/IEC JTC 1/SC 29/WG 11, No. m41357, No. G1001_v1, JVET-G1001, 7th Meeting, Jul. 13, 2017-Jul. 21, 2017, Torino, IT, N17055, Aug. 19, 2017, XP030150980, 50 Pages, XP030023716.

Chen Y., et al., "Description of SDR, HDR and 360° Video Coding Technology Proposal by Qualcomm and Technicolor—Low and High Complexity Versions", 10th JVET Meeting, San Diego, US, Apr. 10-20, 2018, The Joint Video Exploration Team (JVET) of ISO/IEC JTC 1/SC 29/WG 11 and ITU-T SG 16 WP 3), No. JVET-J0021-v5, Apr. 14, 2018, XP030151184, pp. 1-43.

Final Office Action from U.S. Appl. No. 16/735,475 mailed Feb. 4, 2021, 23 pages.

Flynn D., et al., "High Efficiency Video Coding (HEVC) Range Extensions text specification: Draft 6," (Joint 31 Collaborative Team on Video Coding of ITU-T SG.16 WP 3 and ISO/IEC JTC1/SC29/WG11), 16th Meeting: San Jose, US, Jan. 9-17, 2014, Document: JCTVC-P1005_v1, 368 pages.

Han Y., et al., "CE4.1.3: Affine Motion Compensation Prediction", Joint Video Exploration Team (JVET) of ITU-T SG 16 WP 3 and ISO/IEC JTC 1/SC 29/WG 11, 11th Meeting: Ljubljana, SI, Jul. 10-18, 2018, JVET-K0337, 6 pages.

He Y., et al., "Efficient Coding with Adaptive Motion Models", 23. Picture Coding Symposium; Apr. 23, 2003-Apr. 25, 2003; Saint Malo, Apr. 23, 2003 (Apr. 23, 2003), XP030080026, 5 pages.

Huawei Technologies: "Affine Transform Prediction for Next Generation Video Coding", ITU-T SG16 Meeting, Oct. 12, 2015-Oct. 23, 2015 (Oct. 12-23, 2015), Geneva, No. T13-SG16-C-1016, Sep. 29, 2015, XP030100743, 11 Pages.

International Preliminary Report on Patentability—PCT/US2018/055209, The International Bureau of WIPO—Geneva, Switzerland, Apr. 23, 2020 9 Pages.

International Search Report and Written Opinion—PCT/US2018/055209—ISA/EPO—Jan. 2, 2019 16 Pages.

ITU-T H.223, "Series H: Audiovisual and Multimedia Systems, Infrastructure of Audiovisual Services—Transmission Multiplexing and Synchronization, Multiplexing Protocol for Low Bit Rate Multimedia Communication", The International Telecommunication Union, Jul. 2001, 74 Pages.

ITU-T H.261, Line Transmission of Non-Telephone Signals, Video Codec for Audiovisual Services At p×64 kbits, The International Telecommunication Union, Mar. 1993, 29 pp.

ITU-T H.262 (Feb. 2000), "Information Technology—Generic Coding of Moving Pictures and Associated Audio Information: Video", Series H: Audiovisual and Multimedia Systems, Infrastructure of Audiovisual Services—Coding of Moving Video, Feb. 2000, 220 pages.

ITU-T H.263, "Video Coding for Low Bit Rate Communication", Series H: Audiovisual and Multimedia Systems, Infrastructure of audiovisual services—Coding of moving video, Jan. 2005, 226 pages.

ITU-T H.264, Series H: Audiovisual and Multimedia Systems, Infrastructure of Audiovisual Services—Coding of Moving Video, Advanced Video Coding for Generic Audiovisual Services, The International Telecommunication Union, Jun. 2011, 674 Pages.

"ITU-T H.265, Series H: Audiovisual and Multimedia Systems, Infrastructure of Audiovisual Services—Coding of Moving Video, High Efficiency Video Coding", The International Telecommunication Union, Apr. 2015, 634 Pages, please consider section 7.4.9.6 on p. 102, section 8.5.3.2.6 on p. 141, section 8.5.3.2.7 on pp. 141-145, and section 8.5.3.2.8 on p. 145.

Li L., et al., "An Efficient Four-Parameter Affine Motion Model for Video Coding", Cornell University Library, 201 Olin Library Cornell University Ithaca, NY 14853, Feb. 21, 2017, XP080747890, pp. 1-14.

Non-Final Office Action for U.S. Appl. No. 01/163,472 mailed May 23, 2019, 37 Pages.

Non-Final Office Action from U.S. Appl. No. 02/163,472 mailed Sep. 22, 2020, 18 pages.

Prosecution History for U.S. Appl. No. 01/163,472 dated from Nov. 5, 2018 through May 23, 2019, 142 pages.

Prosecution History for U.S. Appl. No. 01/163,472 through Sep. 26, 2019, 8 pages.

Prosecution History for U.S. Appl. No. 01/170,205 dated from Feb. 25, 2019 through Jun. 7, 2019, 41 pages.

Response to Final Office Action mailed Feb. 4, 2021, from U.S. Appl. No. 16/735,475, filed Apr. 2, 2021, 12 pages.

Response to Non-Final Office Action mailed on May 11, 2021 from U.S. Appl. No. 16/735,475, filed Aug. 11, 2021, 13 pages.

Response to Non-Final Office Action mailed Sep. 22, 2020, from U.S. Appl. No. 02/163,472, 11 pages.

Response to the Non-Final Office Action for U.S. Appl. No. 01/163,472 dated from May 23, 2019 through Jul. 17, 2019, 17 pages.

Segall A., et al., "Joint Call for Proposals on Video Compression with Capability Beyond HEVC," Joint Video Exploration Team (JVET) of ITU-T SG 16 WP 3 and ISO/IEC JTC 1/SC 29/WG 11, 8th Meeting: Macao, CN, Oct. 18-24, 2017, No. JVET-H1002, Oct. 23, 2017, 27 Pages.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668, Jan. 1, 2012, 20 Pages.

Taiwan Search Report—TW107135856—TIPO—Nov. 20, 2021 1 Page.

U.S. Appl. No. 16/601,486, filed Oct. 14, 2019, Naming inventors Chen et al.

U.S. Appl. No. 16/735,475, filed Jan. 6, 2020, Naming inventors Zou et al.

Wang Y., et al., "High Efficiency Video Coding (HEVC) Defect Report 2," JCT-VC Meeting; Oct. 23-Nov. 1, 2013; San Jose; (Joint Collaborative Team on Video Coding of ISO/IEC JTC1/SC29/WG11 and ITU-T SG.16); No. JCTVC-O1003_v2; Nov. 24, 2013; 311 pp.

Wang Y., et al., "High Efficiency Video Coding (HEVC) Defect Report 2", Joint Collaborative Team on Video Coding (JCT-VC) of ITU-T SG 16 WP 3 and ISO/IEC JTC 1/SC 29/WG 11, 15th Meeting: Geneva, Oct. 23-Nov. 1, 2013, JCTV-O1002-v2, 311 pp.

Wang Y-K., et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, No. JCTVC-N1003_v1, 14th Meeting, Vienna, AT, Jul. 25-Aug. 2, 2013, 311 Pages, Please consider section 8.5.3.2.6 on p. 125, section 8.5.3.2.7 on pp. 126-129, and section 8.5.3.2.8 on pp. 129 and 130.

Wiegand T., et al., "Core Experiment Description on Affine Motion Compensation", Study Group 16 Video Coding Experts Group (Question 15) Eighth Meeting, Berlin, Germany, Aug. 3-6, 1999, [Q15-H-34r1], 1999, pp. 1-13.

Yang H., et al., "Description of CE4: Inter Prediction and Motion Vector Coding", Joint Video Experts Team (JVET) of ITU-T SG 16 WP 3 and ISO/IEC JTC 1/SC 29/WG 11, JVET-J1024r2, 10th Meeting: San Diego, US, Apr. 10-20, 2018, 46 pages.

Zou F., et al., "EE4: Improved Affine Motion Prediction", 4th JVET Meeting, Oct. 15, 2016-Oct. 21, 2016, Chengdu, CN, (The Joint Video Exploration Team of ISO/IEC JTC1/SC29/WG11 and ITU-T SG. 16 WP3), URL: http://phenix.int-evry.fr/jvet/, No. JVET-D0121, Oct. 6, 2016 (Oct. 6, 2016), [JVET-D0121] (version 1), pp. 1-4, XP030150372, paragraph [0001], paragraph [0002],[0038][0040][0055].

Zou F., et al., "Improved Affine Motion Prediction," JVET Meeting; May 26-Jun. 1, 2016; Geneva; The Joint Video Exploration Team of ISO/IEC JTC1/SC29/WG11 and ITU-T SG.16, DOC:JVET-C0062-v2, Apr. 4, 2017, JVET-C0062 (version 3), pp. 1-5.

Zou F., et al., "Improved Affine Motion Prediction," JVET Meeting; May 26-Jun. 1, 2016; Geneva; The Joint Video Exploration Team of ISO/IEC JTC1/SC29/WG11 and ITU-T SG.16, No. JVET-C0062, May 17, 2016, XP030150163, 5 pages.

\* cited by examiner

AFFINE PREDICTION IN VIDEO CODING

This application is a continuation of U.S. patent application Ser. No. 16/155,744, filed 9 Oct. 2018, which claims the benefit of U.S. Provisional Application No. 62/570,417 filed 10 Oct. 2017, the entire content of each application being incorporated herein by reference.

TECHNICAL FIELD

This disclosure relates to devices, systems, and methods for video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes techniques related to inter-picture prediction, more specifically affine motion compensation in block-based video coding. The techniques of this disclosure may be applied to current or future video coding standards.

In one example, a method of decoding video data includes obtaining, from a syntax structure in a bitstream comprising an encoded representation of the video data, a syntax element indicating whether 6-parameter affine prediction is enabled for blocks corresponding to the syntax structure, wherein the blocks corresponding to the syntax structure comprise a first block; based on the syntax element indicating that the 6-parameter affine prediction is enabled for the blocks corresponding to the syntax structure, using the 6-parameter affine prediction to generate a predictive block for the first block; and using the predictive block and residual data to reconstruct the first block.

In another example, a method of encoding video data includes determining that 6-parameter affine prediction is enabled for blocks corresponding to a syntax structure, wherein the blocks corresponding to the syntax structure comprise a first block; in response to determining that the 6-parameter affine prediction is enabled for the blocks corresponding to the syntax structure, using one of 4-parameter affine prediction or the 6-parameter affine prediction to generate a predictive block for the first block; using the predictive block to determine residual data for the first block; and including, in a bitstream, the residual data and a syntax structure comprising a syntax element indicating that the 6-parameter affine prediction is enabled for the blocks corresponding to the syntax structure.

In another example, a device for decoding video data includes a memory configured to store video data and one or more processors coupled to the memory, implemented in processing circuitry, and configured to: obtain, from a syntax structure in a bitstream comprising an encoded representation of the video data, a syntax element indicating whether 6-parameter affine prediction is enabled for blocks corresponding to the syntax structure, wherein the blocks corresponding to the syntax structure comprise a first block; based on the syntax element indicating that the 6-parameter affine prediction is enabled for the blocks corresponding to the syntax structure, use the 6-parameter affine prediction to generate a predictive block for the first block; and use the predictive block and residual data to reconstruct the first block.

In another example, a device for encoding video data, the device includes a memory configured to store video data and one or more processors coupled to the memory, implemented in processing circuitry, and configured to: determine that 6-parameter affine prediction is enabled for blocks corresponding to a syntax structure, wherein the blocks corresponding to the syntax structure comprise a first block; in response to determining that the 6-parameter affine prediction is enabled for the blocks corresponding to the syntax structure, use one of 4-parameter affine prediction or the 6-parameter affine prediction to generate a predictive block for the first block; use the predictive block to determine residual data for the first block; and include, in a bitstream, the residual data and a syntax structure comprising a syntax element indicating that the 6-parameter affine prediction is enabled for the blocks corresponding to the syntax structure.

In another example, a computer-readable storage medium storing instructions that when executed by one or more processors cause the one or more processors to obtain, from a syntax structure in a bitstream comprising an encoded representation of the video data, a syntax element indicating whether 6-parameter affine prediction is enabled for blocks corresponding to the syntax structure, wherein the blocks corresponding to the syntax structure comprise a first block; based on the syntax element indicating that the 6-parameter affine prediction is enabled for the blocks corresponding to the syntax structure, use the 6-parameter affine prediction to generate a predictive block for the first block; and use the predictive block and residual data to reconstruct the first block.

In another example, an apparatus for decoding video data includes means for obtaining, from a syntax structure in a bitstream comprising an encoded representation of the video data, a syntax element indicating whether 6-parameter affine prediction is enabled for blocks corresponding to the syntax structure, wherein the blocks corresponding to the syntax structure comprise a first block; means for using the 6-parameter affine prediction to generate a predictive block for the first block based on the syntax element indicating that the 6-parameter affine prediction is enabled for the blocks corresponding to the syntax structure; and means for using the predictive block and residual data to reconstruct the first block.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
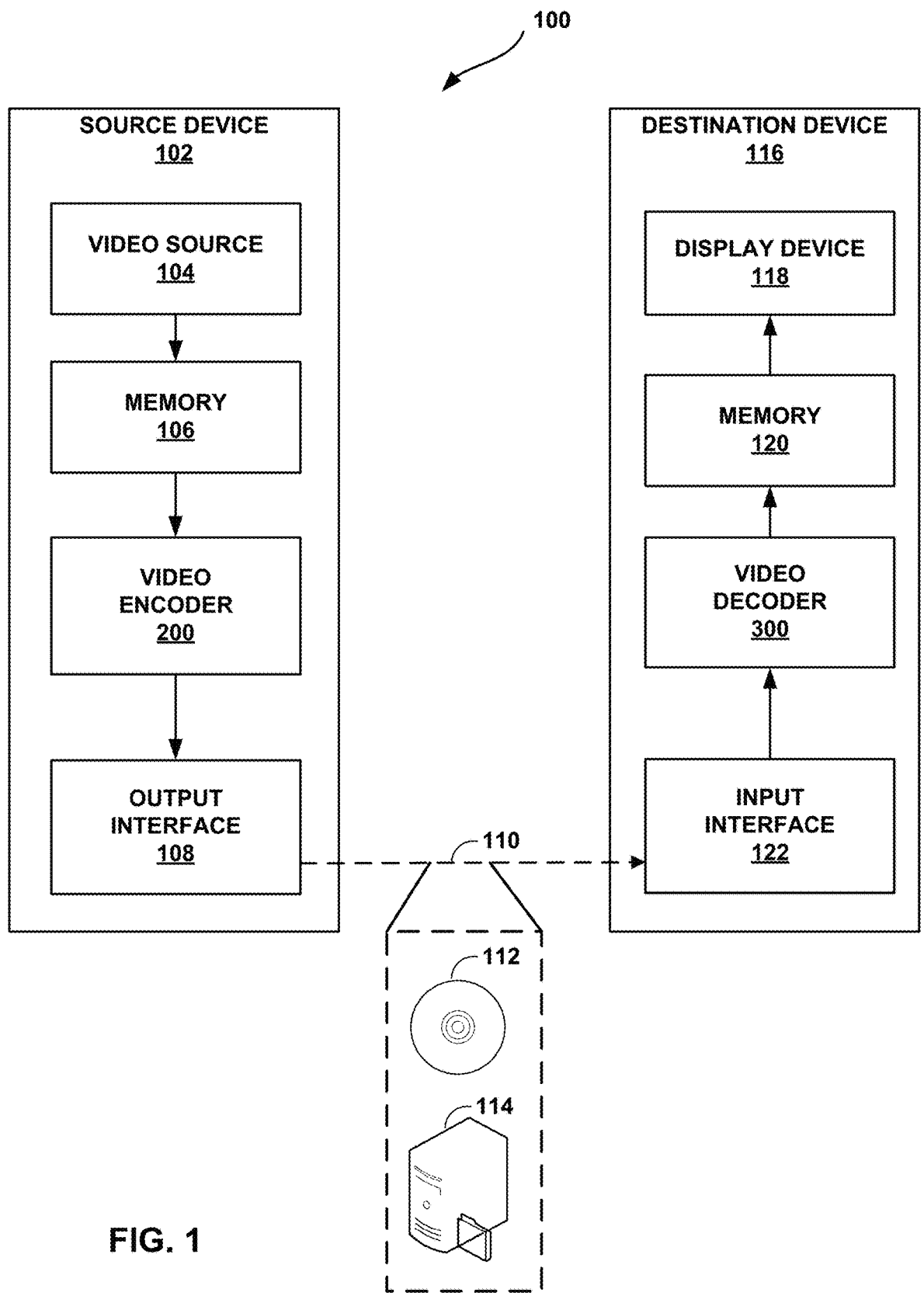
FIG. 1 is a block diagram illustrating an example video encoding and decoding system that may utilize one or more techniques described in this disclosure.
Figure 2A:
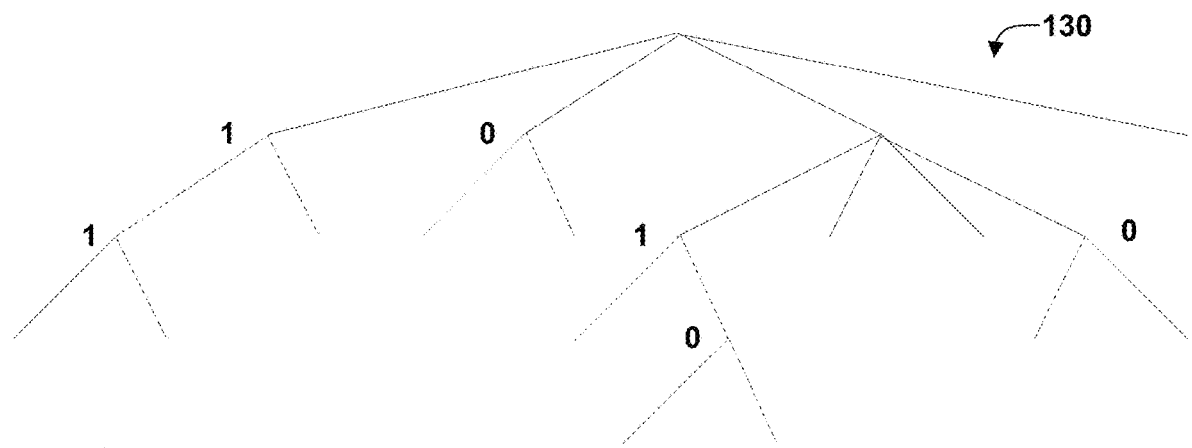
FIGS. 2A and 2B are conceptual diagrams illustrating an example quadtree binary tree (QTBT) structure, and a corresponding coding tree unit (CTU).
Figure 2B:
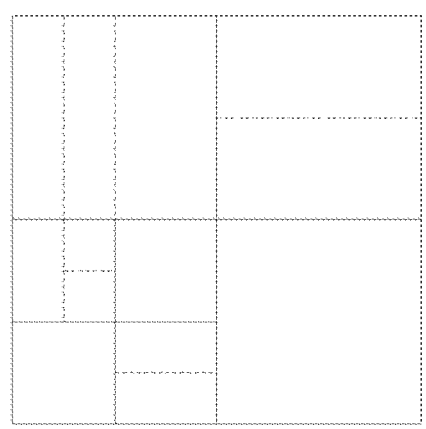

The use of affine motion models has been proposed to provide further compression of video data. An affine motion model for a block expresses rotation of the block in a series of pictures. An affine motion model of a block can be determined based on motion vectors of control points of the block. In some implementations, the control points of the block are the top-left and top-right corners of the block. In some implementations, the control points of the block further include the bottom-left corner of the block. A video coder (i.e., a video encoder or a video decoder) may calculate motion vectors of sub-blocks of the block based on the motion vectors of the control points of the block.

Two primary techniques have been proposed for signaling the motion vectors of the control points of a block. The first technique is called the affine inter mode. The second technique is called the affine merge mode. In the affine inter mode, a video encoder generates an affine motion vector predictor (MVP) set candidate list for a current block. The affine MVP set candidate list is a list of affine MVP sets. Each affine MVP set is a set of MVPs corresponding to different control points of the current block. The video encoder signals an index that identifies to a video decoder a selected affine MVP set in the affine MVP set candidate list. Additionally, the video encoder signals a motion vector difference (MVD) for each of the control points of the current block. The motion vector of a control point may be equal to the MVD for the control point plus the motion vector predictor for control point in the selected affine MVP set. The video encoder also signals a reference index that identifies a reference picture which the video decoder is use with the current block. The video decoder generates the same affine MVP set candidate list and uses the signaled index to determine the selected affine MVP set. The video decoder may add the MVDs to motion vectors of the selected affine MVP set to determine the motion vector of the control points of the current block.

In the affine merge mode, a video encoder and a video decoder identify the same affine source block for a current block. The affine source block may be an affine-coded block that spatially neighbors the current block. The video encoder and video decoder extrapolate the motion vectors of the control points of the current block from the motion vectors of the control points of the affine source block. For instance, the video encoder and the video decoder may construct an affine motion model that describes motion vectors of locations within the current block. The affine motion model is defined by a set of affine parameters. The video encoder and the video decoder may determine the affine parameters based on the motion vectors of the control points of the current block. The video encoder and the video decoder may determine the motion vectors of the control points of the current block based on motion vectors of control points of the affine source block.

As will be explained in greater detail below, the techniques of this disclosure may improve the overall cost associated with affine prediction by enabling more flexibility in terms of the types of affine prediction that may be performed for a given block, while also maintaining efficient signaling overhead. According to the techniques of this disclosure, a syntax element indicating whether 6-parameter affine prediction is enabled for blocks corresponding to a syntax structure, possibly in conjunction with other syntax elements, may be used to enable certain types of affine prediction when those types of affine prediction result in improved video compression, but may also reduce the bit overhead associated with affine prediction when certain types of affine prediction does not improve compression by a certain amount. Thus, implementing the techniques of this disclosure may enable video encoding and video decoding devices to achieve improved rate-distortion tradeoff.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 20, and output interface 108. Destination device 116 includes input interface 122, video decoder 30, memory 120, and display device 118. In accordance with this disclosure, video encoder 20 of source device 102 and video decoder 30 of destination device 116 may be configured to apply the techniques for affine prediction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for affine prediction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 20 and video decoder 30 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 20, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 20 encodes the captured, pre-captured, or computer-generated video data. Video encoder 20 may rearrange the pictures from the received order (sometimes referred to as "display order") into a coding order for coding. Video encoder 20 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 30. Additionally or alternatively, memories 106, 120 may store software instructions executable by, e.g., video encoder 20 and video decoder 30, respectively. Although shown separately from video encoder 20 and video decoder 30 in this example, it should be understood that video encoder 20 and video decoder 30 may also include internal memories for functionally similar or equivalent purposes. Furthermore, memories 106, 120 may store encoded video data, e.g., output from video encoder 20 and input to video decoder 30. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may include one or both of a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 20 and/or output interface 108, and destination device 116 may include an SoC device to perform the functionality attributed to video decoder 30 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 20, which is also used by video decoder 30, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 20 and video decoder 30 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may include an integrated circuit, a microprocessor, and/or a wireless communication device, such as a cellular telephone.

Video encoder 20 and video decoder 30 may operate according to a video coding standard, such as ITU-T H.265, also referred to as High Efficiency Video Coding (HEVC) or extensions thereto, such as the multi-view and/or scalable video coding extensions. Alternatively, video encoder 20 and video decoder 30 may operate according to other proprietary or industry standards, such as the Joint Exploration Test Model (JEM). The techniques of this disclosure, however, are not limited to any particular coding standard.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). There is evidence that significant improvements in coding efficiency can be obtained by exploiting the characteristics of video content, especially for the high-resolution content like 4K, with novel dedicated coding tools beyond H.265/HEVC. Based on the work of ITU-T VCEG (Q6/16) and ISO/IEC MPEG (JTC 1/SC 29/WG 11), a new video coding standard, referred to as the Versatile Video Coding (VVC) standard, is under development by the Joint Video Expert Team (JVET) of VCEG and MPEG. An early draft of the VVC is available in the document JVET-J1001 "Versatile Video Coding (Draft 1)" and its algorithm description is available in the document JVET-J1002 "Algorithm description for Versatile Video Coding and Test Model 1 (VTM 1)."

In general, video encoder 20 and video decoder 30 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 20 and video decoder 30 may code video data represented in a YUV (e.g., Y, Cb, Cr) format. That is, rather than coding red, green, and blue (RGB) data for samples of a picture, video encoder 20 and video decoder 30 may code luminance and chrominance components, where the chrominance components may include both red hue and blue hue chrominance components.

In some examples, video encoder 20 converts received RGB formatted data to a YUV representation prior to encoding, and video decoder 30 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 20) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 20 and video decoder 30 may be configured to operate according to JEM or VVC. According to JEM, a video coder (such as video encoder 20) partitions a picture into a plurality of CTUs. Video encoder 20 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 20 and video decoder 30 may use a single QTBT structure to represent each of the luminance and chrominance components, while in other examples, video encoder 20 and video decoder 30 may use two or more QTBT structures, such as one QTBT structure for the luminance component and another QTBT structure for both chrominance components (or two QTBT structures for respective chrominance components).

Video encoder 20 and video decoder 30 may be configured to use quadtree partitioning per HEVC, QTBT partitioning according to JEM, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 20 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 20 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 20 may generate the prediction block using one or more motion vectors. Video encoder 20 may generally perform a motion search to identify a reference block that closely matches the CU, e.g., in terms of differences between the CU and the reference block. Video encoder 20 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 20 may predict the current CU using uni-directional prediction or bi-directional prediction.

JEM also provides an affine motion compensation mode, which may be considered an inter-prediction mode. In affine motion compensation mode, video encoder 20 may determine two or more motion vectors that represent non-translational motion, such as zoom in or out, rotation, perspective motion, or other irregular motion types.

To perform intra-prediction, video encoder 20 may select an intra-prediction mode to generate the prediction block. JEM provides sixty-seven intra-prediction modes, including various directional modes, as well as planar mode and DC mode. In general, video encoder 20 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 20 codes CTUs and CUs in raster scan order (left to right, top to bottom).

Video encoder 20 encodes data representing the prediction mode for a current block. For example, for inter-prediction modes, video encoder 20 may encode data representing which of the various available inter-prediction modes is used, as well as motion information for the corresponding mode. For uni-directional or bi-directional inter-prediction, for example, video encoder 20 may encode motion vectors using advanced motion vector prediction (AMVP) or merge mode. Video encoder 20 may use similar modes to encode motion vectors for affine motion compensation mode.

Following prediction, such as intra-prediction or inter-prediction of a block, video encoder 20 may calculate residual data for the block. The residual data, such as a residual block, represents sample by sample differences between the block and a prediction block for the block, formed using the corresponding prediction mode. Video encoder 20 may apply one or more transforms to the residual block, to produce transformed data in a transform domain instead of the sample domain. For example, video encoder 20 may apply a discrete cosine transform (DCT), an integer transform, a wavelet transform, or a conceptually similar transform to residual video data. Additionally, video encoder 20 may apply a secondary transform following the first transform, such as a mode-dependent non-separable secondary transform (MDNSST), a signal dependent transform, a Karhunen-Loeve transform (KLT), or the like. Video encoder 20 produces transform coefficients following application of the one or more transforms.

As noted above, following any transforms to produce transform coefficients, video encoder 20 may perform quantization of the transform coefficients. Quantization generally refers to a process in which transform coefficients are quantized to possibly reduce the amount of data used to represent the coefficients, providing further compression. By performing the quantization process, video encoder 20 may reduce the bit depth associated with some or all of the coefficients. For example, video encoder 20 may round an n-bit value down to an m-bit value during quantization, where n is greater than m. In some examples, to perform quantization, video encoder 20 may perform a bitwise right-shift of the value to be quantized.

Following quantization, video encoder 20 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 20 may utilize a predefined scan order to scan the quantized transform coefficients to produce a serialized vector, and then entropy encode the quantized transform coefficients of the vector. In other examples, video encoder 20 may perform an adaptive scan. After scanning the quantized transform coefficients to form the one-dimensional vector, video encoder 20 may entropy encode the one-dimensional vector, e.g., according to context-adaptive binary arithmetic coding (CABAC). Video encoder 20 may also entropy encode values for syntax elements describing metadata associated with the encoded video data for use by video decoder 30 in decoding the video data.

To perform CABAC, video encoder 20 may assign a context within a context model to a symbol to be transmitted. The context may relate to, for example, whether neighboring values of the symbol are zero-valued or not. The probability determination may be based on a context assigned to the symbol.

Video encoder 20 may further generate syntax data, such as block-based syntax data, picture-based syntax data, and sequence-based syntax data, to video decoder 30, e.g., in a picture header, a block header, a slice header, or other syntax data, such as a sequence parameter set (SPS), picture parameter set (PPS), or video parameter set (VPS). Video decoder 30 may likewise decode such syntax data to determine how to decode corresponding video data.

In this manner, video encoder 20 may generate a bitstream including encoded video data, e.g., syntax elements describing partitioning of a picture into blocks (e.g., CUs) and prediction and/or residual information for the blocks. Ultimately, video decoder 30 may receive the bitstream and decode the encoded video data.

In general, video decoder 30 performs a reciprocal process to that performed by video encoder 20 to decode the encoded video data of the bitstream. For example, video decoder 30 may decode values for syntax elements of the bitstream using CABAC in a manner substantially similar to, albeit reciprocal to, the CABAC encoding process of video encoder 20. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 30 may inverse quantize and inverse transform the quantized transform coefficients of a block to reproduce a residual block for the block. Video decoder 30 uses a signaled prediction mode (intra- or inter-prediction) and related prediction information (e.g., motion information for inter-prediction) to form a prediction block for the block. Video decoder 30 may then combine the prediction block and the residual block (on a sample-by-sample basis) to reproduce the original block. Video decoder 30 may perform additional processing, such as performing a deblocking process to reduce visual artifacts along boundaries of the block.

This disclosure may generally refer to "signaling" certain information, such as syntax elements. The term "signaling" may generally refer to the communication of values syntax elements and/or other data used to decode encoded video data. That is, video encoder 20 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 3A:
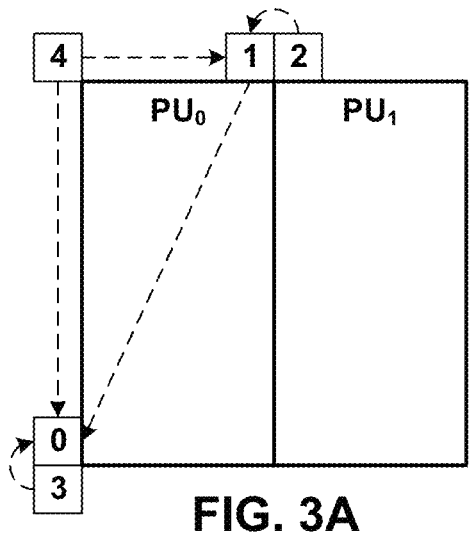
FIG. 3A illustrates spatial neighboring motion vector (MV) candidates for merge mode.
Figure 3B:
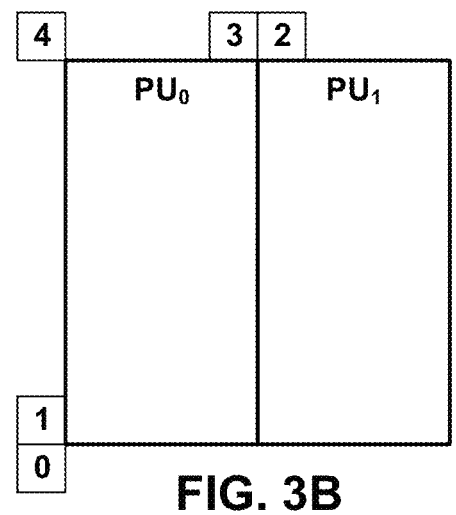
FIG. 3B illustrates spatial neighboring MV candidates for Advanced Motion Vector Prediction (AMVP) mode.

FIGS. 3A and 3B are conceptual diagram illustrating an example QTBT structure 130, and a corresponding CTU 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 20 may encode, and video decoder 30 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 20 may encode, and video decoder 30 may decode, video data, such as prediction and transform data, for CUs represented by terminal leaf nodes of QTBT structure 130.

In general, CTU 132 of FIG. 3B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, then the node is not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having width equal to MinBTSize (4, in this example) implies no further horizontal splitting is permitted. Similarly, a binary tree node having a height equal to MinBTSize implies no further vertical splitting is permitted for that binary tree node. As noted above, leaf nodes of the binary tree are referred to as CUs and are further processed according to prediction and transform without further partitioning.

In H.265/HEVC, for each block, a set of motion information can be available. A set of motion information contains motion information for forward and backward prediction directions. Here, forward and backward prediction directions are two prediction directions of a bi-directional prediction mode. The terms "forward" and "backward" do not necessarily have a geometry meaning but instead correspond to two reference picture lists; reference picture list 0 (RefPicList0) and reference picture list 1 (RefPicList1) of a current picture. When only one reference picture list is available for a picture or slice, only RefPicList0 is available and the motion information of each block of a slice is always forward.

For each prediction direction, the motion information must contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component.

Picture order count (POC) is widely used in video coding standards to identify a display order of a picture. Although there are cases two pictures within one coded video sequence may have the same POC value, it typically does not happen within a coded video sequence. When multiple coded video sequences are present in a bitstream, pictures with a same value of POC may be closer to each other in terms of decoding order. POC values of pictures are typically used for reference picture list construction, derivation of reference picture set as in HEVC and motion vector scaling.

A video coder may perform uni-directional inter prediction or bi-directional inter prediction for a current block (e.g., a CU or PU). When performing uni-directional inter prediction for the current block, the video coder uses a motion vector to determine a location in a reference picture. The video coder may then generate a predictive block for the current block. The predictive block may include a block of samples in the reference picture at the location indicated by the motion vector, or a block of samples interpolated from samples of the reference picture. When performing bi-directional inter prediction, the video coder may perform this process with a second reference picture and a second motion vector, thereby generating a second predictive block for the current block. In bi-directional inter prediction, the predictive blocks generated from single reference pictures may be referred to herein as preliminary predictive blocks. Furthermore, in bi-directional inter prediction, the video coder may generate, based on the two preliminary blocks, a final predictive block for the current block. In some examples, the video coder may generate the final predictive block such that each sample in the final predictive block is a weighted average of corresponding samples in the preliminary predictive blocks.

To support inter prediction in a picture, a video coder generates two reference picture lists for the picture. The picture's reference picture lists include reference pictures that are available for use in performing inter prediction of blocks in the picture. The two reference picture lists are commonly referred to as List 0 and List 1. In one example, each reference picture in the picture's List 0 occurs prior to the picture in output order. In this example, each reference picture in the picture's List 1 occurs after the picture in output order. Hence, use of a reference picture in List 0 may be considered a first inter prediction direction and use of a reference picture in List 1 may be considered a second inter prediction direction. Video encoder 20 and video decoder 30 generate the picture's List 0 with reference pictures in the same order. Likewise, video encoder 20 and video decoder 30 generate the picture's List 1 with reference pictures in the same order. Thus, video encoder 20 may indicate to video decoder 30 a reference picture in a reference picture list by signaling a reference index that indicates a location in the reference picture list of the reference picture.

The HEVC standard provides multiple inter prediction modes, including merge mode and advanced motion vector prediction (AMVP) mode. In other words, in HEVC standard, there are two inter prediction modes, named merge (skip is considered as a special case of merge) and advanced motion vector prediction (AMVP) modes respectively for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list. The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined. As can be seen above, a merge candidate corresponds to a full set of motion information while an AMVP candidate contains just one motion vector for a specific prediction direction and reference index. The candidates for both modes are derived similarly from the same spatial and temporal neighboring blocks.

More specifically, in merge mode, video encoder 20 and video decoder 30 generate matching merge motion vector (MV) candidate lists for a PU. The merge MV candidate list for the PU includes one or more merge candidates, which may also be referred to as motion vector predictors (MVPs). In HEVC, the merge MV candidate list contains up to 5 merge candidates. Each respective merge candidate in the merge MV candidate list specifies one or more motion vector(s) and one or more reference index(es). For example, a merge candidate may specify a List 0 motion vector and/or a List 1 motion vector and may specify a List 0 reference index and/or a List 1 reference index. A List 0 motion vector is a motion vector that indicates a location in a reference picture in List 0. A List 1 motion vector is a motion vector that indicates a location in a reference picture in List 1. Video encoder 20 may signal a merge index that indicates a location in the merge MV candidate list of a selected merge candidate for the PU. Video decoder 30 may use the merge index to identify the selected merge candidate. Video decoder 30 may then use the motion vectors and reference indexes of the selected merge candidate as the motion vectors and reference indexes of the PU.

In AMVP mode, video encoder 20 generates a List 0 AMVP candidate list and/or a List 1 AMVP candidate list for a PU, either of which may be referred to as an AMVP candidate list. Video decoder 30 generates AMVP candidate lists matching the AMVP candidate lists generated by video encoder 20. In HEVC, an AMVP candidate list contains two AMVP candidates. Each respective AMVP candidate in a List 0 AMVP candidate list specifies a respective List 0 motion vector. Each respective AMVP candidate in a List 1 AMVP candidate list specifies a respective List 1 motion vector. In the AMVP mode, if the PU is uni-directionally inter predicted from List 0 or bi-directionally inter predicted, video encoder 20 signals a List 0 MVP index, a List 0 reference index, and a List 0 motion vector difference (MVD). The List 0 MVP index specifies a location of a selected AMVP candidate in the List 0 AMVP candidate list. The List 0 reference index specifies a location of a selected List 0 reference picture. The List 0 MVD specifies a difference between a List 0 motion vector of the PU and the List 0 motion vector specified by the selected AMVP candidate in the List 0 AMVP candidate list. Accordingly, video decoder 30 may use the List 0 MVP index and the List 0 MVD to determine the List 0 motion vector of the PU. Video decoder 30 may then determine a preliminary or final predictive block for the PU including samples corresponding to a location in the selected List 0 reference picture identified by the List 0 motion vector of the PU. Video encoder 20 may signal similar syntax elements for List 1 and video decoder 30 may use the syntax elements for List 1 in a similar way.

As can be seen above, a merge candidate corresponds to a full set of motion information while an AMVP candidate contains just one motion vector for a specific prediction direction. The candidates for both merge mode and AMVP mode may be derived similarly from the same spatial and temporal neighboring blocks.

FIG. 3A and FIG. 3B show examples of neighboring blocks that may be used to derive spatial MV candidates. Spatial MV candidates are derived from the neighboring blocks shown in FIG. 3A and FIG. 3B, for a specific PU ($PU_0$), although the methods generating the candidates from the blocks differ for merge and AMVP modes. FIG. 3A illustrates spatial neighboring MV candidates for merge mode. In merge mode, up to four spatial MV candidates can be derived with the order shown in FIG. 3A with numbers, and the order is the following: left (0), above (1), above-right (2), below-left (3), and above-left (4).

FIG. 3B illustrates spatial neighboring MV candidates for AMVP mode. In AMVP mode, the neighboring blocks are divided into two groups: a left group consisting of the block 0 and 1, and an above group consisting of the blocks 2, 3, and 4 as shown in FIG. 3B. For each group, the potential candidate in a neighboring block referring to the same reference picture as that indicated by the signaled reference index has the highest priority to be chosen to form a final candidate of the group. It is possible that all neighboring blocks don't contain a motion vector pointing to the same reference picture. Therefore, if such a candidate cannot be found, the first available candidate will be scaled to form the final candidate, thus the temporal distance differences can be compensated. For example, as part of generating a List 0 AMVP candidate list, the video coder checks whether block 0 is predicted from List 0 and, if so, whether a List 0 reference picture of block 0 is the same as the current PU's List 0 reference picture. If block 0 is predicted from List 0 and the block 0's List 0 reference picture is the same as the current PU's List 0 reference picture, the video coder includes block 0's List 0 motion vector in the List 0 AMVP candidate list. If not, the video coder checks whether block 0 is predicted from List 1 and, if so, whether block 0's List 1 reference picture is the same as the current PU's List 0 reference picture. If block 0 is predicted from List 0 and block 0's List 1 reference picture is the same as the current PU's List 0 reference picture, the video coder includes block 0's List 1 motion vector in the List 0 AMVP candidate list. If block 0's List 1 reference picture is not the same as the current PU's List 0 reference picture, the video coder repeats this process with block 1 instead of block 0.

However, if block 1 is not predicted from List 1 or block 1's List 1 reference picture is not the same as the current PU's List 0 reference picture, the video coder determines whether block 0 is predicted from List 0 and, if so, determines whether block 0's List 0 reference picture and the current PU's List 0 reference picture are both long-term reference pictures or both short-term reference pictures. If block 0's List 0 reference picture and the current PU's List 0 reference picture are both long-term reference pictures or block 0's List 0 reference picture and the current PU's List 0 reference picture are both short-term reference pictures, the video coder may scale block 0's List 0 motion vector based on a temporal difference between block 0's List 0 reference picture and the current PU's List 0 reference picture. The video coder includes the scaled List 0 motion vector into the List 0 AMVP candidate list. If block 0's List 0 reference picture is a long-term reference picture and the current PU's List 0 reference picture is a short-term reference picture, or vice versa, the video coder determines whether block 0 is predicted from List 1 and, if so, determines whether block 0's List 1 reference picture and the current PU's List 0 reference picture are both long-term reference pictures or both short-term reference pictures. If block 0's List 1 reference picture and the current PU's List 0 reference picture are both long-term reference pictures or block 0's List 1 reference picture and the current PU's List 0 reference picture are both short-term reference pictures, the video coder may scale block 0's List 1 motion vector based on a temporal difference between block 0's List 1 reference picture and the current PU's List 0 reference picture. The video coder includes the scaled List 0 motion vector into the List 0 AMVP candidate list. If block 0's List 1 reference picture is a long-term reference picture and the current PU's List 0 reference picture is a short-term reference picture, or vice versa, the video coder repeats this process with block 1 instead of block 0.

The video coder may perform a similar process for blocks 2, 3, and 4 to include a second candidate in the current PU's List 0 AMVP candidate list. Additionally, the video coder may repeat this entire process, swapping references to List 0 with List 1 and reference to List 1 with List 0, to generate the current PU's List 1 AMVP candidate list.

Thus, in AVMP mode, the neighboring blocks are divided into two groups: left group consisting of the block 0 and 1, and above group consisting of the blocks 2, 3, and 4 as shown in FIG. 3B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate may be scaled to form the final candidate; thus, the temporal distance differences can be compensated.

A video coder may include a temporal motion vector predictor (TMVP) candidate, if enabled and available, into a merge MV candidate list after spatial motion vector candidates or an AMVP candidate list. For instance, in the case of AMVP, the video coder may include the TMVP candidate in the AMVP candidate list if the spatial neighboring blocks are unavailable (e.g., because the spatial neighboring blocks are outside a picture, slice, or tile boundary, because the spatial neighboring blocks are intra predicted, etc.). In merge mode, a TMVP candidate may specify List 0 and/or List 1 motion vectors of a temporal neighbor block. The reference indexes for the TMVP candidate in the merge mode are always set to 0. In AMVP mode, a TMVP candidate specifies either a List 0 motion vector of a temporal neighbor block or a List 1 motion vector of the temporal neighbor block. The temporal neighbor block is a block in a reference picture. The process of motion vector derivation for a TMVP candidate may be the same for both merge and AMVP modes.

As noted above, a video coder may scale a motion vector. When scaling a motion vector, it is assumed that the value of a motion vector is proportional to the distance of pictures in the presentation time. A motion vector associates two pictures, the reference picture, and the picture containing the motion vector (namely, the containing picture). When a motion vector is used to predict the other motion vector, the distance of the containing picture and the reference picture is calculated based on Picture Order Count (POC) values of the reference picture and the containing picture.

For a motion vector being predicted, a new distance (based on POC) may be calculated based on the POC value of a picture containing the predicted block a reference picture. The motion vector is, for example, scaled based on these two POC values. For a spatial neighboring candidate, the containing pictures for the two motion vectors are the same, while the reference pictures are different. In HEVC, motion vector scaling applies to both TMVP and AMVP for spatial and temporal neighboring candidates.

Furthermore, in some implementations, if a MV candidate list (e.g., a merge MV candidate list or an AMVP candidate list) is not complete (e.g., includes less than a predetermine number of candidates), a video coder may generate and insert artificial motion vector candidates at the end of the MV candidate list until the MV candidate list has the required number of candidates. In merge mode, there are two types of artificial MV candidates: combined candidates derived only for B-slices and zero candidates. A combined candidate specifies a combination of a List 0 motion vector from one merge candidate and a List 1 motion vector for a different merge candidate. Zero candidates are used for motion vector prediction only if the first type (i.e., combined candidates) does not provide enough artificial candidates. A zero candidate is a candidate that specifies a MV whose horizontal and vertical components are each equal to 0.

For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Additionally, a video coder may apply a pruning process for candidate insertion. Candidates from different blocks may happen to be the same, which may decrease the efficiency of a merge/AMVP candidate list. A pruning process is applied to solve this problem. It compares one candidate against the others in the current candidate list to avoid inserting identical candidate in certain extent. To reduce the complexity, only limited numbers of pruning process is applied instead of comparing each potential one with all the other existing ones.

Motion compensation in H.265/HEVC are used to generate a predictor for the current inter block. Quarter pixel accuracy motion vector is used and pixel values at fractional positions are interpolated using neighboring integer pixel values for both luma and chroma components.

In many examples video codec standards, only a translation motion model is applied for motion compensation prediction (MCP). However, in the real world, there are many kinds of motions, e.g. zoom in/out, rotation, perspective motions and the other irregular motions. If only a translation motion model is applied for MCP in such test sequences with irregular motions, it will affect the prediction accuracy and may result in low coding efficiency. For many years, video experts have tried to design many algorithms to improve MCP for higher coding efficiency. In JEM, an affine transform motion compensation prediction is applied to improve the coding efficiency. An affine merge and affine inter modes are proposed to deal with affine motion models with 4 parameters as:

$$\begin{cases} v_x = ax + by + c \\ v_y = dx + ey + f \end{cases} \quad (1)$$

In equation (1), $v_x$ is a horizontal component of a motion vector for position (x, y) within the block, and $v_y$ is a vertical component of the motion vector for position (x, y) within the block. In equation (1), a, b, c, d, e, and f are parameters. Note that in the affine motion model, different positions within the block have different motion vectors.

Figure 4:
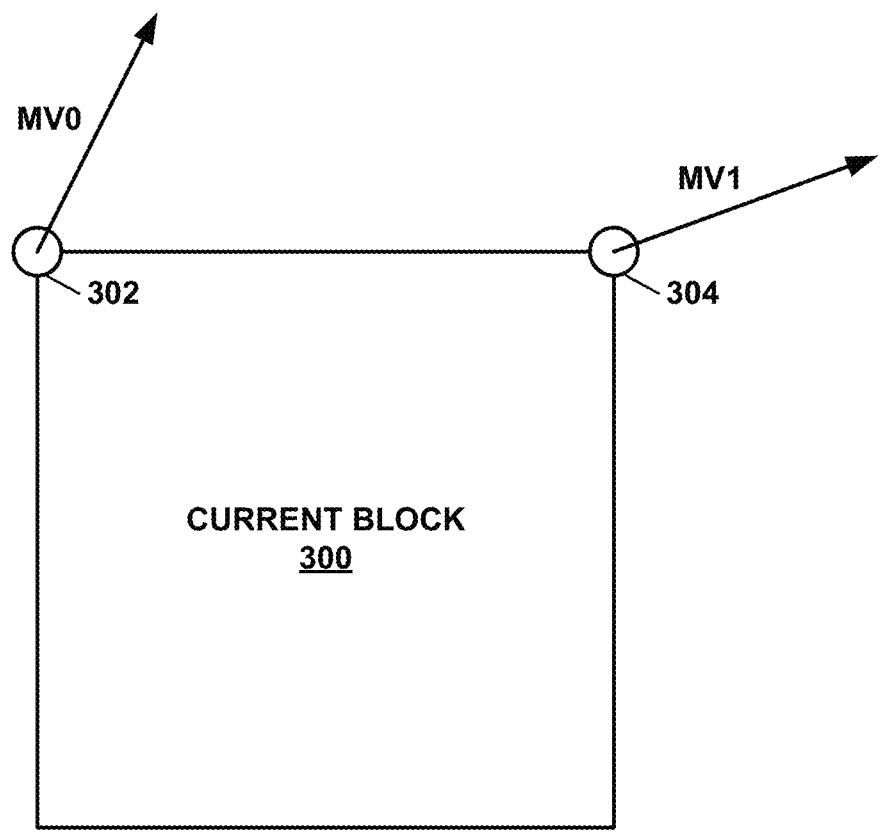
FIG. 4 is a conceptual diagram illustrating an example of two-point MV affine mode with four affine parameters.

FIG. 4 is a conceptual diagram illustrating an example of two-point MV affine mode with four affine parameters. The 4-parameter affine motion model may be represented by a motion vector of a top-left control point ($V_0$) and a motion vector of a top-right control point ($V_1$). FIG. 4 illustrates a simplified affine motion model for a current block 300. As shown in FIG. 4, an affine motion field of the block is described by two control point motion vectors MV0 and MV1. MV1 is a control point motion vector for a top-left control point 302 of current block 300. MV1 is a control point motion vector for a top-right control point 304 of current block 300.

The motion vector field (MVF) of a block is described by the following equation:

$$\begin{cases} mv_x = \dfrac{(mv_{1x} - mv_{0x})}{w} x - \dfrac{(mv_{1y} - mv_{0y})}{w} y + mv_{0x} \\ mv_y = \dfrac{(mv_{1y} - mv_{0y})}{w} x + \dfrac{(mv_{1x} - mv_{0x})}{w} y + mv_{0y} \end{cases} \quad (2)$$

In equation (2), $v_x$ is a horizontal component of a motion vector for a position (x, y) in a block; $v_y$ is a vertical component of the motion vector for the position (x, y) in the block; ($v_{0x}$, $v_{0y}$) is a motion vector of the top-left corner control point (e.g., top-left control point 402); ($v_{1x}$, $v_{1y}$) is a motion vector of the top-right corner control point (e.g., top-right control point 404); and w is a width of the block. Thus, a video coder may use equation (2) to "extrapolate" motion vectors for positions (x, y) based on motion vectors of control points of the block. In examples of the JEM software, the affine motion prediction is only applied to square block. As natural extension, the affine motion prediction can be applied to non-square block.

To further simplify the motion compensation prediction, block-based affine transform prediction may be applied. Thus, rather than deriving motion vectors for each location in a block, a video coder may derive motion vectors for sub-blocks of the block. In JEM, the sub-blocks are 4×4 blocks. To derive a motion vector of a sub-block, the video coder may calculate the motion vector of a center sample of the sub-block according to equation (2). The video coder may then round the calculated motion vector to 1/16 fraction accuracy. The rounded motion vector may be referred to herein as a high-accuracy motion vector. Then, the video coder may apply motion compensation interpolation filters to generate predictions (i.e., predictive blocks) of each of the sub-blocks with derived motion vectors.

Figure 5:
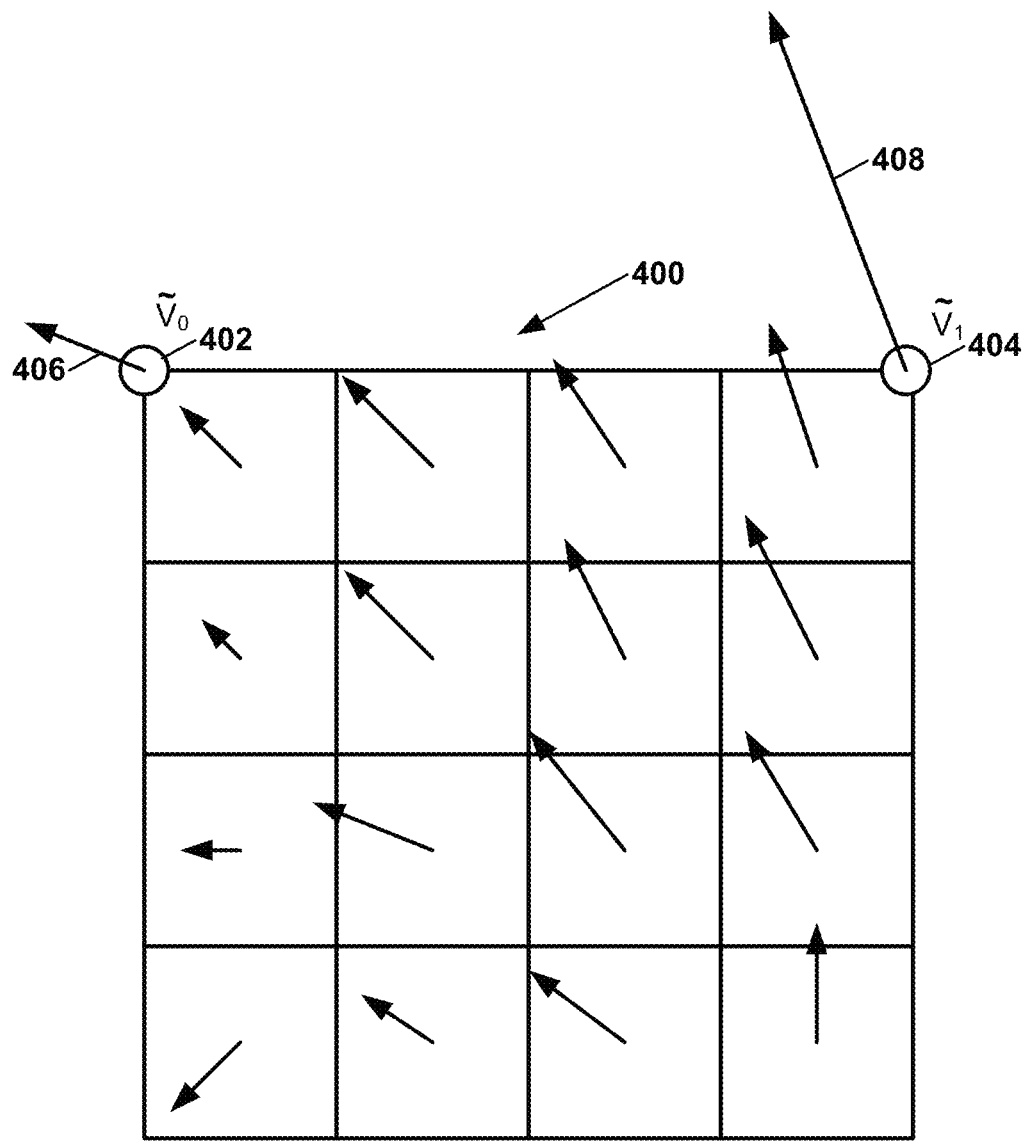
FIG. 5 illustrates an affine motion vector field (MVF) per sub-block.

FIG. 5 illustrates an example affine motion vector field (MVF) per sub-block. As shown in the example of FIG. 5, a current block 400 has a top-left control point 402 and a top-right control point 404. A video coder may calculate, based on a motion vector 406 for top-left control point 402 and a motion vector 408 for top-right control point 404, motion vectors for sub-blocks of current block 400. FIG. 5 shows the motion vectors of the sub-blocks as small arrows.

After MCP, the high-accuracy motion vector of each sub-block is rounded and saved as the same accuracy as the normal motion vector. In some examples, the rounding of the high-accuracy motion vector is only performed when the precision of the stored motion vectors is less then the high-accuracy motion vectors.

There are two affine motion modes in one example of JEM: AF_INTER mode and AF_MERGE mode. In JEM, the AF_INTER mode can be applied for CUs with both width and height larger than 8. An affine flag is signaled at the CU level in the bitstream to indicate whether AF_INTER mode is used. In the AF_INTER mode, video encoder 20 signals a List 0 reference index and/or a List 1 reference index for the current block to indicate a List 0 reference picture and/or a List 1 reference picture.

In the AF_INTER mode, video encoder 20 and video decoder 30 each construct one or more candidate lists (i.e., affine MVP set candidate lists) for a current block. For instance, video encoder 20 and video decoder 30 may each construct a List 0 affine MVP set candidate list and/or a List 1 affine MVP set candidate list. Each of the affine MVP set candidate lists includes a respective set of affine MVP sets. In a 4-parameter affine motion model, an affine MVP set in a List 0 affine MVP set candidate list specifies two List 0 motion vectors (i.e., a motion vector pair). In a 4-parameter affine motion model, an affine MVP set in a List 1 affine MVP set candidate list specifies two List 1 motion vectors.

Figures 6A, 6B:
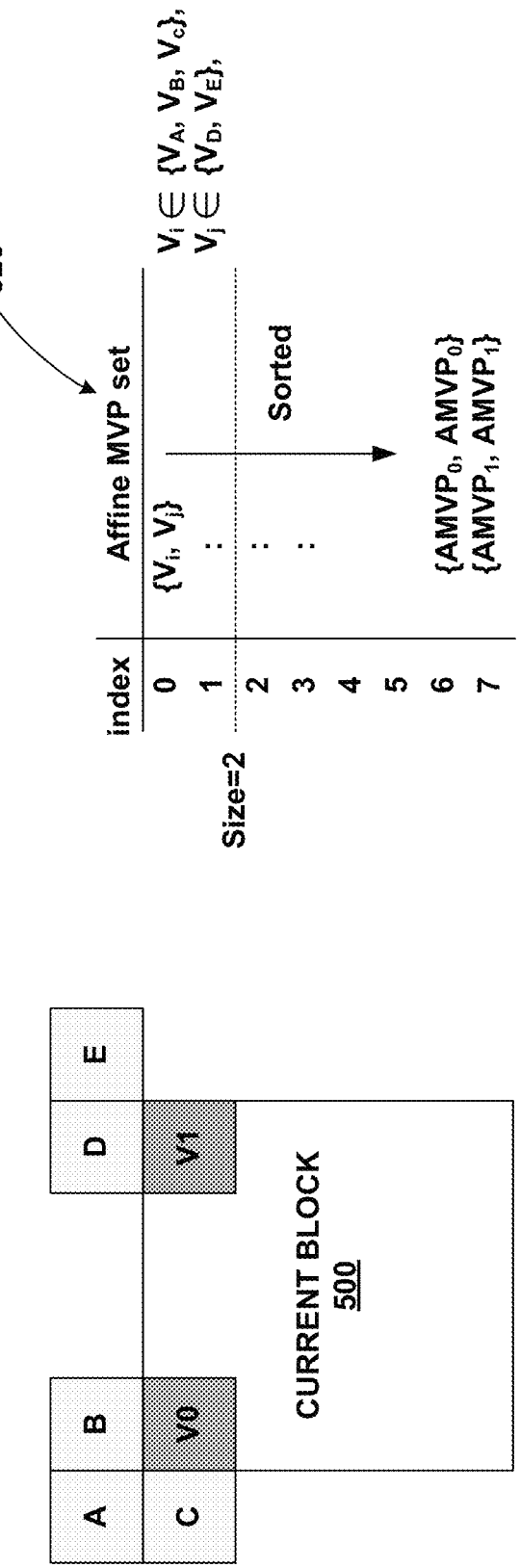
FIG. 6A is a block diagram illustrating a current block and neighboring blocks as used in the AF_INTER mode.
FIG. 6B illustrates an example affine motion vector predictor set candidate list.

Initially, a video coder (e.g., video encoder 20 or video decoder 30) attempts to fill an affine MVP set candidate list with motion vector pairs of the type $\{(v_0, v_1) | v_0 = \{v_A, v_B, v_C\}, v_1 = \{v_D, v_E\}\}$ using neighbor blocks. FIG. 6A is a block diagram illustrating a current block 500 and neighboring blocks as used in the AF_INTER mode. As shown in FIG. 6A, $V_0$ is selected from the motion vectors of blocks A, B or C. The motion vector from the neighbor block is scaled according to the reference list and a relationship among the POC of the reference for the neighbor block, the POC of the reference for the current CU, and the POC of the current CU. For example, suppose the video coder selects a List 0 motion vector of a neighbor block (e.g., block A, B, or C) as $V_0$. In this example, the List 0 motion vector of the neighbor block indicates a position in the neighbor block's reference picture (i.e., the reference for the neighbor block). Furthermore, in this example, video encoder 20 may select and signal a List 0 reference index indicating a reference picture for the current CU (i.e., the reference for the current CU). If the neighbor block's reference picture is not the same as the reference picture for the current CU, the video coder may scale the neighbor block's List 0 motion vector based on a difference between a reference temporal distance and a current temporal distance. The reference temporal distance is a temporal distance between the POC of the neighbor block's reference picture and a POC of the current CU. The current temporal distance is a temporal distance between the POC of the current CU and a POC of the reference picture for the current CU. The video coder may perform a similar process for a List 1 motion vector. The approach to select $v_1$ from neighbor blocks D and E is similar.

If the number of candidates in the candidate list is smaller than 2, the candidate list may be padded by motion vector pairs composed by duplicating each of the AMVP candidates {AMVP0, AMVP0} and {AMVP1, AMVP1}. In other words, a video coder may generate two AMVP candidates in the manner described above. The two AMVP candidates are denoted AMVP0 and AMVP1. The video coder may then include, in candidate list 520 of FIG. 6B, a first affine motion vector predictor candidate that specifies AMVP0 as a motion vector for a first control point and specifies AMVP0 as a motion vector for a second control point. If the number of candidates in the candidate list is still smaller than 2 after including the first affine MVP candidate in candidate list 520, the video coder includes a second affine MVP candidate in candidate list 520, where the second affine MVP candidate specifies AMVP1 as the motion vector for the first control point and specifies AMVP1 as the motion vector for the second control point.

When candidate list 520 is larger than 2, the video coder firstly sorts the candidates in candidate list 520 according to the consistency of the neighboring motion vectors (similarity of the two motion vectors in a pair candidate). The video coder only keeps the first two candidates, as shown in FIG. 6B with the line label "Size=2". Video encoder 20 may use a rate-distortion cost check to determine which motion vector set candidate is selected as the control point motion vector prediction (CPMVP) of the current CU. Video encoder 20 may signal in the bitstream an index indicating the position of the CPMVP in candidate list 520. Video decoder 30 may obtain the index from the bitstream and use the index to determine which of the candidates in candidate list 620 is the CPMVP. After the CPMVP of the current affine CU is determined, affine motion estimation is applied and the control point motion vector (CPMV) is found. Video encoder 20 signals in the bitstream a difference between the CPMV and the CPMVP. In other words, video encoder 20 signals a motion vector difference (MVD) in the bitstream.

For every CU/PU whose size is equal to or larger than 16×16, AF_INTER mode can be applied as follows. If the current CU/PU is in AF_INTER mode, an affine flag in CU/PU level is signalled in the bitstream. A candidate list $\{(v_0, v_1)|v_0=\{v_A, v_B, v_c\}, v_1=\{v_D, v_E\}\}$ is built using the neighbour valid reconstructed blocks. As shown in FIG. 6A, $v_0$ is selected from the motion vectors of the blocks A, B or C. The motion vector from the neighbour block is scaled according to the reference list and the relationship among the POC of the reference for the neighbour block, the POC of the reference for the current CU/PU and the POC of the current CU/PU. The approach to select $v_1$ from the neighbour block D and E is similar. If the number of candidate list is smaller than 2, the candidates of AMVP are assigned to $v_0$ and $v_1$. Rate-distortion optimization (RDO) cost of the current CU/PU is used to determine which $(v_0, v_1)$ is selected as the control point motion vector prediction (CPMVP) of the current CU/PU. The index to indicate the position of the CPMVP in the candidate list is signalled in the bitstream. After the CPMVP of the current affine CU/PU is determined, affine motion estimation is applied and the CPMV is found. Then, the difference of the CPMV and the CPMVP is coded in the bitstream. Affine motion compensation prediction mentioned above is applied to generate the residues of the current CU/PU. Finally, the residues of the current CU/PU are transformed, quantized, and coded into the bitstream as the traditional procedure.

Figure 7A:
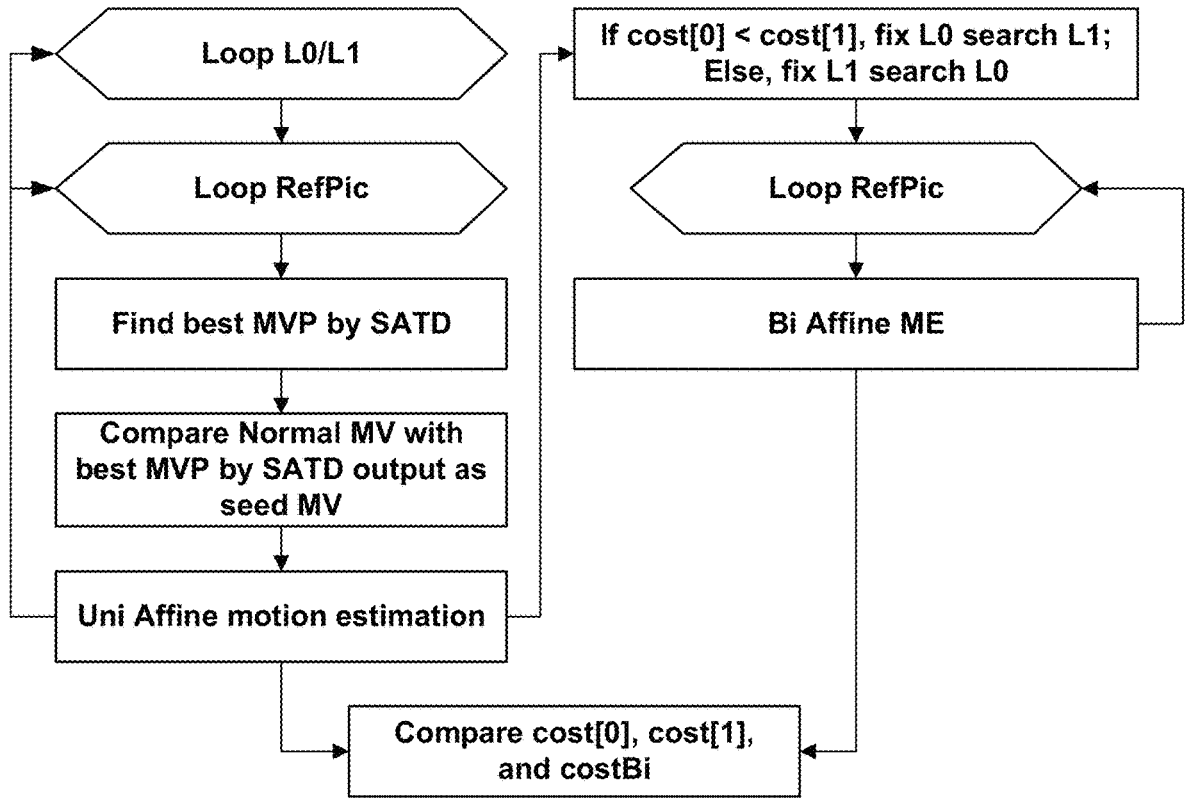
FIG. 7A is a flowchart illustrating an example strategy for affine motion estimation as adopted in the Joint Exploration Model.
Figure 7B:
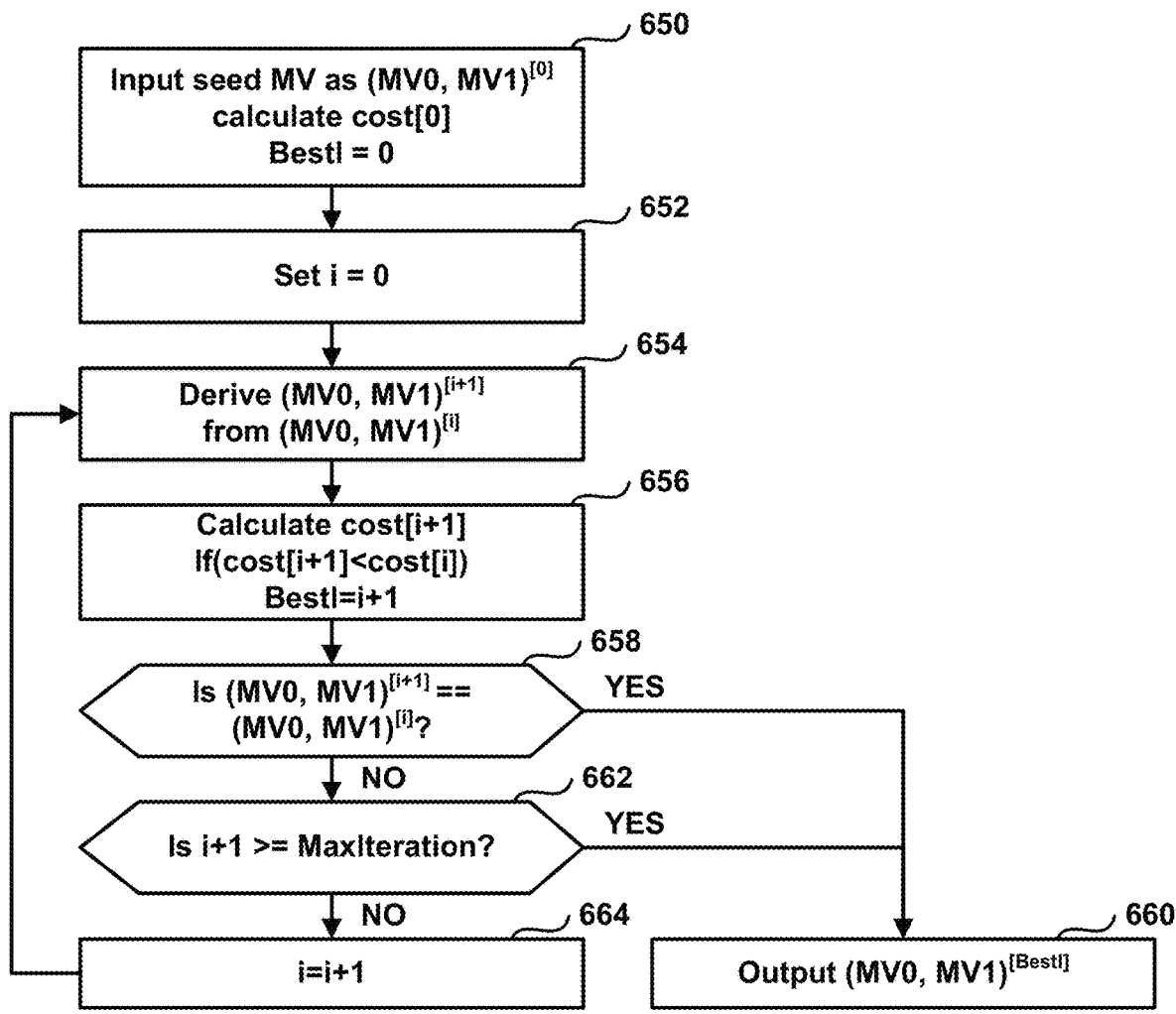
FIG. 7B is a flowchart illustrating an example iterative strategy for affine motion estimation.

FIG. 7A is a flowchart showing an example motion estimation (ME) algorithm process for a JEM-based encoder. Affine ME applies an iterative strategy as shown in FIG. 7B. The search begins with a seed (MV0, MV1). At each iteration, a refined (MV0, MV1) is derived. After MaxIteration times iterations, the best (MV0, MV1) with the minimum Sum of Absolute Transformed Distortion (SATD) cost is output as the affine motions for this block.

The seed (MV0, MV1) is important to find the true best affine motions. In the affine ME procedure, several sets of (MVP0, MVP1) for affine motions are used as candidates. An MV found by the normal ME for non-affine inter prediction may also taken as a candidate (MV, MV) for the affine inter prediction. These candidates are compared by the SATD cost of affine motion compensation. The motions with the minimum cost are treated as the seed motions.

In the example of FIG. 7B, video encoder 20 determines an input seed MV as (MV0, MV1)[0], calculates cost[0], determines Best1=0 (650). Video encoder 20 sets i equal to zero (652). For i=0 to i+1≥MaxIteration, video encoder 20 derives (MV0, MV1)$^{[i+1]}$ from (MV0, MV1)$^{[i]}$ (654). Video encoder 20 calculates cost[i+1] and if (cost[i+1] less than cost[i]), then video encoder 20 sets Best1 equal to i+1 (656). If (MV0, MV1)$^{[i+1]}$ equals (MV0, MV1)$^{[i]}$ (658, yes), then video encoder 20 outputs (MV0, MV1)$^{[Best]}$ (660). In other words, if the refinement process does not improve upon the previous seed MV, then the refinement process stops. (MV0, MV1)$^{[Best]}$ may be either of MV0, MV1)$^{[i+1]}$ or (MV0, MV1)$^{[i]}$. If (MV0, MV1)$^{[i+1]}$ does not equal (MV0, MV1)$^{[i]}$ (658, no) and i+1 is not ≥MaxIteration (662, no), then video encoder 20 increments I (664) and repeats steps 654 and 656 until the conditions of one of steps 658 or 662 are met.

Figure 8B:
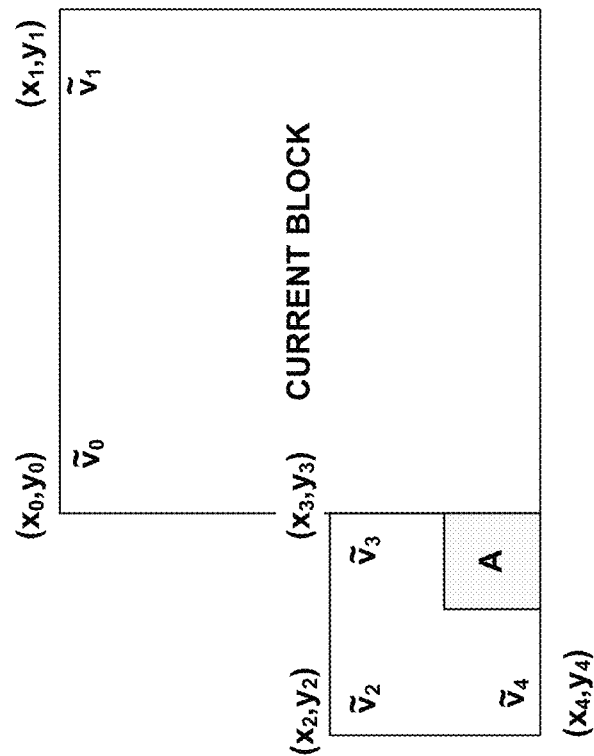
FIG. 8B illustrates AF_MERGE when a neighbor left-bottom block is coded in affine mode.
Figure 8A:
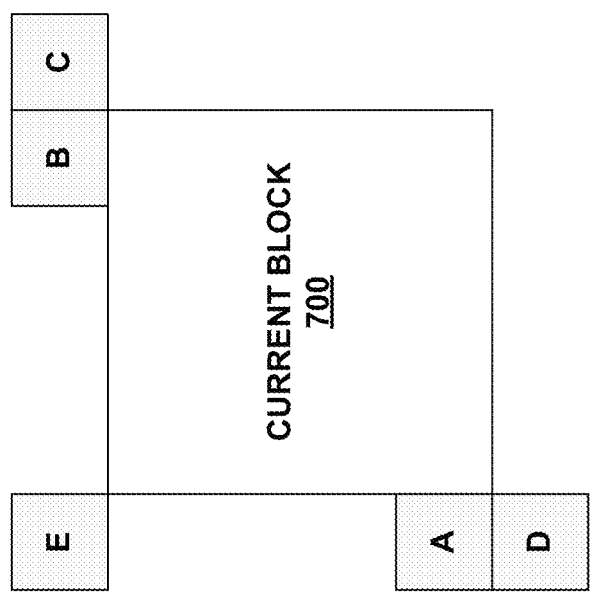
FIG. 8A shows neighboring blocks used when coding a current block in AF_MERGE mode.

When the current CU/PU is applied in AF_MERGE mode, it gets the first block coded with affine mode from the valid neighbour reconstructed blocks. The selection order for the candidate block is from left, above, above-right, left-bottom to above-left as shown in FIG. 8A. FIG. 8A shows neighboring blocks used when coding a current block 700 in AF_MERGE mode. A visiting order (i.e., a selection order) for the neighboring blocks is from left (A), above (B), above-right (C), left-bottom (D) to above-left (E) as shown in FIG. 8A. For example, if the neighbour left-bottom block A is coded in affine mode as shown in FIG. 8B, the motion vectors $v_2$, $v_3$ and $v_4$ of the top-left corner, above-right corner and left-bottom corner of the CU/PU which contains the block A are derived. The motion vector $v_0$ of the top-left corner of the current CU/PU is calculated according to $v_2$, $v_3$ and $v_4$. Similarly, the motion vector $v_1$ of the above-right of the current CU/PU is calculated based on $v_2$, $v_3$, and $v_4$. After the CPMV of the current CU/PU $v_0$ and $v_1$ are achieved, according to the simplified affine motion model defined in equation (2), the MVF of the current CU/PU is generated. Then, Affine MCP is applied as described elsewhere in this disclosure. In order to identify whether the current CU/PU is coded with AF_MERGE mode, an affine flag is signalled in the bitstream when there's at least one neighbour block coded in affine mode. If no affine block neighbour the current block exists as shown in FIG. 8A, no affine flag is written in the bit stream.

For instance, in this example, for X=0 and/or X=1, the video coder may extrapolate the List X motion vector of a top-left control point of neighboring block B to generate the List X motion vector of a top-left control point of current block 700, use a List X reference index of the top-left control point of neighboring block B as the List X reference index of the top-left control point of current block 700, extrapolate the List X motion vector of a top-right control point of neighboring block B to generate the List X motion vector of a top-right control point of current block 700, and use a List X reference index of the top-right control point of neighboring block B as the List X reference index of the top-right control point of current block 700. In this example, the video coder may use equation (2), above, to extrapolate a motion vector of a control point of neighboring block B to determine a motion vector of a control point of current block 700, using an (x, y) position of the control point of current block 700 as x and y in equation (2).

In HEVC, context adaptive binary arithmetic coding (CABAC) is used to convert a symbol into a binarized value. This process is called binarization. Binarization enables efficient binary arithmetic coding via a unique mapping of non-binary syntax elements to a sequence of bits, which are called bins.

In JEM2.0 reference software, for affine merge mode, only the affine flag is coded, and the merge index is inferred to be the first available neighboring affine model in the predefined checking order A-B-C-D-E. For the affine inter mode, two MVD syntaxes are coded for each prediction list indicating the motion vector difference between derived affine motion vector and predicted motion vector.

In U.S. patent application Ser. No. 15/587,044, filed May 4, 2017, a switchable affine motion prediction scheme is described. A block with affine prediction can choose to use four-parameter affine model or six-parameter affine model adaptively. An affine model with 6 parameters is defined as:

$$\begin{cases} mv_x = ax + by + e \\ mv_y = cx + dy + f \end{cases} \quad (3)$$

Figure 9:
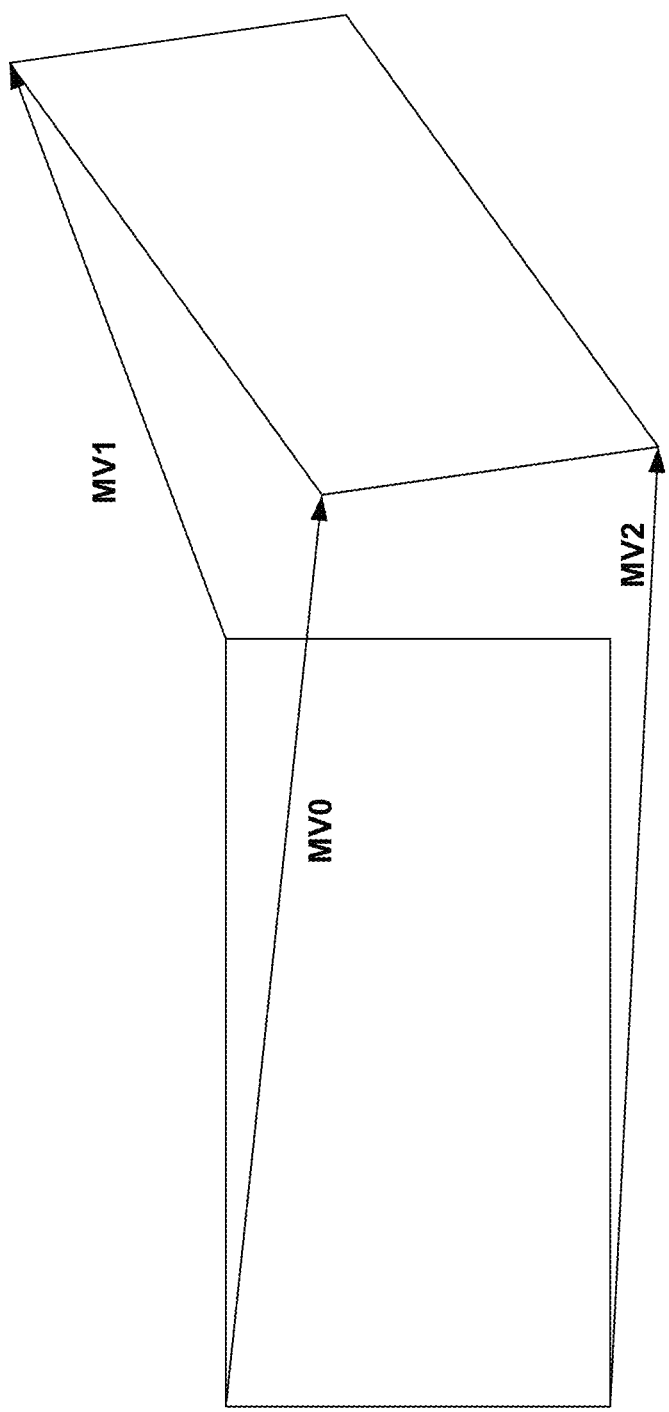
FIG. 9 is a conceptual diagram of an affine model with six parameters.

An affine model with 6 parameters has three control points. In other words, an affine model with 6 parameters is determined by three motion vectors as shown in FIG. 9. MV0 is the first control point motion vector on top-left corner, MV1 is the second control point motion vector on above-right corner of the block, and MV2 is the third control point motion vector on left-bottom corner of the block, as shown in FIG. 9. The affine model built with the three motion vectors is calculated as:

$$\begin{cases} mv_x = \dfrac{(mv_{1x} - mv_{0x})}{w} x - \dfrac{(mv_{2x} - mv_{0x})}{w} y + mv_{0x} \\ mv_y = \dfrac{(mv_{1y} - mv_{0y})}{w} x + \dfrac{(mv_{2y} - mv_{0y})}{w} y + mv_{0y} \end{cases} \quad (4)$$

where w and h are the width and height of the block, respectively.

A similar manner as affine-merge to derive the motion vectors of the top-left corner and the above-right corner as described in elsewhere in this disclosure can also be used to derive the MVPs for the top-left corner, the above-right corner and the below-left corner.

This disclosure proposes several techniques to improve the affine prediction. The following itemized techniques may be applied individually. Alternatively, any combination of the following techniques may be applied together.

In accordance with a first technique of the disclosure, video encoder 20 and/or video decoder 30 may be configured to individually control different types of affine prediction with different number of parameters at sequence level, picture level, slice level or a group of pre-defined blocks (e.g., CTU). For example, two flags as

| affine4_enable_flag | u(1) |
|---|---|
| affine6_enable_flag | u(1) | are signaled in the slice header. The syntax element affine4_enable_flag is equal to 1 if the affine prediction with four parameters is enabled in the slice; otherwise, the affine prediction with four parameters is disabled in the slice. The syntax element affine6_enable_flag is equal to 1 if the affine prediction with six parameters is enabled in the slice; otherwise, the affine prediction with six parameters is disabled in the slice.

Video encoder 20 may be configured to signal such controlling flags in multiple levels of syntax parameter sets. For example, the flags are signaled at the sequence level and slice level, the flag of sequence level are used as condition for slice level flags signalling. As another example, video encoder 20 may be configured to signal the flags at the picture level and slice level, the flag of picture level are used as condition for slice level flags signalling.

SPS Parameter Set

| affine4_sps_enable_flag | u(1) |
|---|---|
| affine6_sps_enable_flag | u(1) |

Slice Header Syntax

| if (affine4_sps_enable_flag) | |
|---|---|
|     affine4_slice_enable_flag | u(1) |
| if (affine6_sps_enable_flag) | |
|     affine6_slice_enable_flag | u(1) |

In accordance with a second technique of this disclosure, video encoder 20 may be configured to set the syntax elements affine4_enable_flag and affine6_enable_flag are to be 0 or 1 independently. When the syntax elements affine4_enable_flag=1 and affine6_enable_flag=1, both affine prediction with four parameters and six parameters are enabled. When the syntax elements affine4_enable_flag=1 and affine6_enable_flag=0, only affine prediction with four parameters is enabled. When the syntax elements affine4_enable_flag=0 and affine6_enable_flag=1, only affine prediction with six parameters is enabled. When the syntax elements affine4_enable_flag=0 and affine6_enable_flag=0, both affine prediction with four parameters and six parameters are disabled. In this case, affine merge mode is also disabled.

In accordance with a third technique of this disclosure, video encoder 20 may be configured to perform block level signaling for affine prediction dependent on the affine control flags at sequence level, picture level or slice level. For example, when the syntax elements affine4_enable_flag=0 and affine6_enable_flag=0, indicating no affine prediction is enabled in the slice, the syntax elements aff_merge_flag and aff_inter_flag are not signaled at block level. The syntax element aff_type, which indicates the affine type (four-parameter affine model or six-parameter affine model) at block level, is not signaled either. When the syntax elements affine4_enable_flag=0 and affine6_enable_flag=1, or the syntax elements affine4_enable_flag=1 and affine6_enable_flag=0, indicating only the affine prediction with four parameters is used, or only the affine prediction with six parameters is used, in the slice, the syntax elements aff_merge_flag and aff_inter_flag are signaled at block level. However, the syntax element aff_type is not signaled in this case because only one type of affine prediction is used. When the syntax elements affine4_enable_flag=1 and affine6_enable_flag=1, indicating both the affine prediction with four parameters and the affine prediction with six parameters are used in the slice, the syntax elements aff_merge_flag and aff_inter_flag are signaled at block level. The syntax element aff_type is also signaled in this case to indicate which kind of affine prediction is used in this block. The table below shows the logic at block level.

```
if((affine4_enable_flag||affine6_enable_flag)
    && other conditions for affine merge)
        aff_merge_flag                           u(1)
    ...
if((affine4_enable_flag||affine6_enable_flag)
    && other conditions for affine inter){
        aff_inter_flag                           u(1)
        if(aff_inter_flag &&
affine4_enable_flag&&affine6_enable_flag)
        aff_type                                 u(1)
    ...
}
```

In accordance with a fourth technique of this disclosure, video encoder 20 and video decoder 30 may be configured to decide whether to use affine prediction with X parameters based on the previously coded pictures. This decision can be made at encoder or decoder. If the decision is made at video encoder 20, the syntax element affineX_enable_flag may be signaled from video encoder 20 to video decoder 30. For example, X can be 4 or 6.

In accordance with a fifth technique of this disclosure, video encoder 20 and video decoder 30 may be configured to decide whether to use affine prediction with X parameters based on the previously coded pictures in the same temporal layer of the current picture. These designated pictures previously coded/decoded are called "pictures in the same category" of the current picture or slice.

In accordance with a sixth technique of this disclosure, video encoder 20 and video decoder 30 may be configured to determine whether to use affine prediction with X parameters based on the previously coded pictures with the same POC % M value, where % indicates the modulo operator. POC is the picture order count of a picture and M is an integer such as 4, 8 or 16. These designated pictures previously coded/decoded are called "pictures in the same category" of the current picture or slice.

In accordance with a seventh technique of this disclosure, video encoder 20 and video decoder 30 may be configured to count the area S of blocks coded with affine inter mode with X parameters previously coded pictures in the same category of the current picture. The total area of blocks (or inter-coded blocks, or inter-coded but not SKIP coded blocks) in the previously coded/decoded inter-coded pictures in the same category of the current picture is P. The ratio S/P is calculated. If S/P<T, affine prediction with X parameters is disabled, i.e., the syntax element affineX_enable_flag is set to 0. Otherwise, affine prediction with X parameters is enabled, i.e., the syntax element affineX_enable_flag is set to 1. T is a threshold, which can be a fixed real number or sent from encoder to decoder.

In accordance with an eighth technique of this disclosure, video encoder 20 and video decoder 30 may be configured to count the area S of all blocks coded with affine inter mode and affine merge in the previously coded pictures in the same category of the current picture. The affine inter mode includes all affine inter modes with any possible parameters, e.g., includes affine inter mode with 4 parameters and affine inter mode with 6 parameters. The total area of blocks in the previously coded/decoded inter-coded pictures in the same category of the current picture is P. The ratio S/P is calculated. If S/P<T, affine prediction with any X parameters is disabled, i.e., the syntax element affineX_enable_flag is set to 0 for all X, e.g., the syntax elements affine4_enable_flag and affine6_enable_flag are set to 0.

In accordance with a ninth technique of this disclosure, video encoder 20 and video decoder 30 may be configured to initialize P and S to 0 before coding the first inter-coded picture and are counted from the first picture. P and S are re-initialized to 0 after coding/decoding a group of pictures and are counted again from the next encoding/decoding picture. For example, P and S are re-initialized to 0 after coding/decoding a group of pictures (GOP) in the hierarchical-B structure and are counted again from the next encoding/decoding picture. In another example, P and S are re-initialized to 0 after coding/decoding each M pictures (such as 16 pictures, 32 pictures, etc.) and are counted again from the next encoding/decoding picture.

In accordance with a tenth technique of this disclosure, video encoder 20 and video decoder 30 may be configured to always perform the motion compensation (MC) process with the motion derivation method of the affine models with 6 parameters, exampled as equation (4). If the current block is coded with the affine model with 4 parameters, MV2 is firstly derived from MV0 and MV1 following equation (2) with x=0 and y=h. Then, motion compensation is conducted with the motion derivation method of the affine models with 6 parameters, with MV0, MV1, and the derived MV2 in the first step.

In accordance with an eleventh technique of this disclosure, video encoder 20 and video decoder 30 may be configured to perform ME for affine prediction with 4 parameters first, followed by the ME affine prediction with 6 parameters. The output (MV0, MV1) of the ME for affine prediction with 4 parameters is used to generate the seed motions of the ME for affine prediction with 6 parameters. For example, MV2 is derived from MV0 and MV1 following equation (2) with x=0 and y=h. Then, (MV0, MV1, MV2) is treated as one candidate seed motion of the ME for affine prediction with 6 parameters. It is compared with other candidates to generate the best seed motion.

In accordance with a twelfth technique of this disclosure, video encoder 20 and video decoder 30 may be configured to perform ME for affine prediction with 6 parameters first, followed by the ME affine prediction with 4 parameters. The output (MV0, MV1, MV2) of the ME for affine prediction with 4 parameters is used to generate the seed motions of the ME for affine prediction with 6 parameters. For example, (MV0, MV1) is treated as one candidate seed motion of the ME for affine prediction with 4 parameters. It is compared with other candidates to generate the best seed motion. In another example, if MV2 is equal to the motion derived from MV0 and MV1 following equation (2) with x=0 and y=h, then the ME affine prediction with 4 parameters is skipped. The current block can be coded with affine prediction with 4 parameters, with motions (MV0, MV1).

Figure 10A:
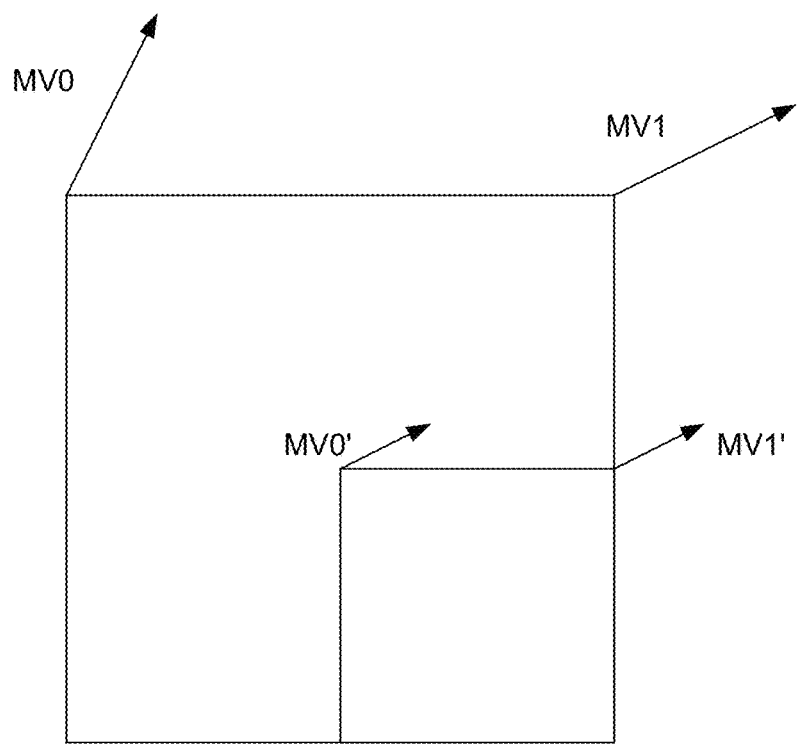
FIG. 10A is a block diagram illustrating example motion seed from affine MVs of parent blocks.
Figure 10B:
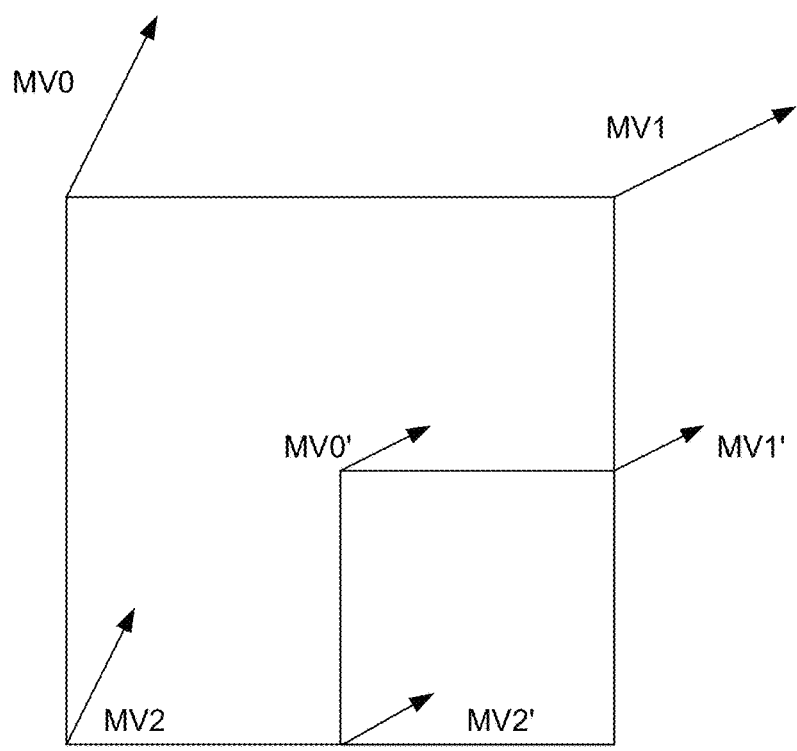
FIG. 10B is a block diagram illustrating example motion seed from affine MVs of parent blocks.

In accordance with a thirteenth technique of this disclosure, video encoder 20 and video decoder 30 may be configured to, for a current block, inherit the motion seed of ME for affine prediction from a parent block. FIG. 10A shows an example for affine ME with 4 parameters. After coding the large block, the resulting affine motions (MV0, MV1) are stored. When coding a small block inside the large block, (MV0', MV1') is derived from MV0 and MV1 using eq. (2). (MV0', MV1') is used as a candidate seed for the ME for affine prediction with 4 parameters. FIG. 10B shows an example for affine ME with 6 parameters. After coding the large block, the resulting affine motions (MV0, MV1, MV2) are stored. When coding a small block inside the large block, (MV0', MV1', MV2') is derived from MV0, MV1 and MV2 using equation (4). (MV0', MV1', MV2') is used as a candidate seed for the ME for affine prediction with 6 parameters.

In accordance with a fourteenth technique of this disclosure, video encoder 20 and video decoder 30 may be configured to such that MV0 is not allowed to be equal to MV1 for affine prediction with 4 parameters. In one example, MV1y cannot be equal to MV0y if MV1x==MV0x. In another example, the motion vectors of the control points are not allowed to be too close to each other. In one example, if the abs(MV0x-MV1x) and abs(MV0y-MV1y) can not be less than a given threshold value.

In accordance with a fifteenth technique of this disclosure, video encoder 20 may be configured to conditionally signal the syntax element aff_inter_flag depending on whether the CPMVPs are close to each other. If the CPMVPs are close to each other, e.g., the sum of absolute difference is smaller than a given threshold, the syntax element aff_inter_flag is not signaled and derived as 0.

In accordance with a sixteenth technique of this disclosure, if the syntax element affine4_enable_flag is 1, video encoder 20 may be configured to select the two control points adaptively based on a cost calculated from a given criterion, and the two points (e.g., selected from top-left, top-right and bottom-left) which minimize the cost is used as the two control points, and the motion vector derivation described in (2) will be accommodated accordingly depending on which two control points are selected. The criterion may include the motion vector difference, reconstructed value difference.

Figure 11:
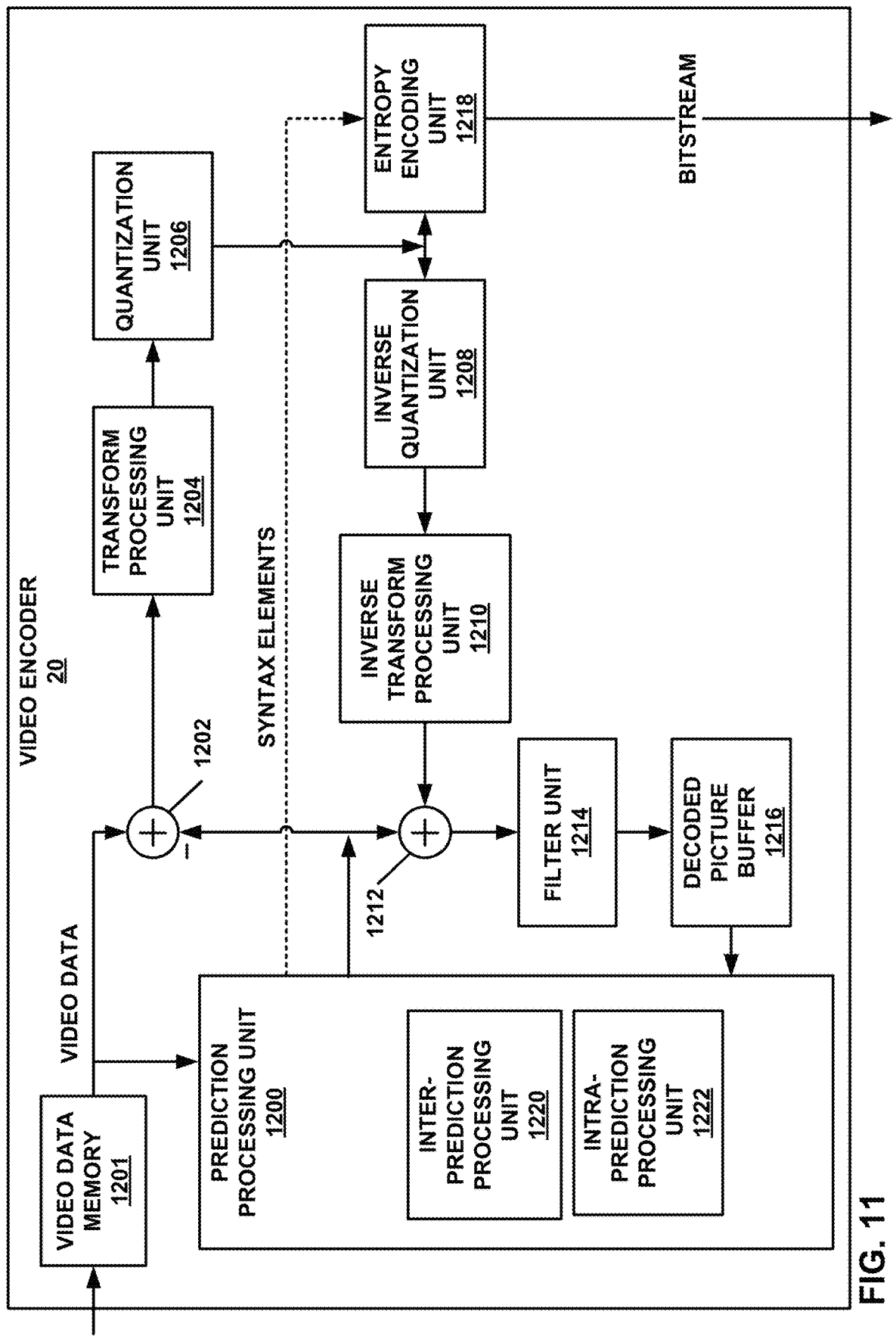
FIG. 11 is a block diagram illustrating an example video encoder that may implement one or more techniques described in this disclosure.

FIG. 11 is a block diagram illustrating an example video encoder 20 that may implement the techniques of this disclosure. FIG. 11 is provided for purposes of explanation and should not be considered limiting of the techniques as broadly exemplified and described in this disclosure. The techniques of this disclosure may be applicable to various coding standards or methods.

In the example of FIG. 11, video encoder 20 includes a prediction processing unit 1200, video data memory 1201, a residual generation unit 1202, a transform processing unit 1204, a quantization unit 1206, an inverse quantization unit 1208, an inverse transform processing unit 1210, a reconstruction unit 1212, a filter unit 1214, a decoded picture buffer 1216, and an entropy encoding unit 1218. Prediction processing unit 1200 includes an inter-prediction processing unit 1220 and an intra-prediction processing unit 1222. Inter-prediction processing unit 1220 may include a motion estimation unit and a motion compensation unit (not shown).

Video data memory 1201 may be configured to store video data to be encoded by the components of video encoder 20. The video data stored in video data memory 1201 may be obtained, for example, from video source 18. Decoded picture buffer 1216 may be a reference picture memory that stores reference video data for use in encoding video data by video encoder 20, e.g., in intra- or inter-coding modes. Video data memory 1201 and decoded picture buffer 1216 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 1201 and decoded picture buffer 1216 may be provided by the same memory device or separate memory devices. In various examples, video data memory 1201 may be on-chip with other components of video encoder 20, or off-chip relative to those components. Video data memory 1201 may be the same as or part of storage media 19 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 1200 may perform partitioning to divide the CTBs of the CTU into progressively-smaller blocks. The smaller blocks may be coding blocks of CUs. For example, prediction processing unit 1200 may partition a CTB associated with a CTU according to a tree structure.

Video encoder 20 may encode CUs of a CTU to generate encoded representations of the CUs (i.e., coded CUs). As part of encoding a CU, prediction processing unit 1200 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 1220 may generate predictive data for a PU. As part of generating the predictive data for a PU, inter-prediction processing unit 1220 performs inter prediction on the PU. The predictive data for the PU may include predictive blocks of the PU and motion information for the PU. Inter-prediction processing unit 1220 may perform different operations for a PU of a CU depending on whether the PU is in an I slice, a P slice, or a B slice. In an I slice, all PUs are intra predicted. Hence, if the PU is in an I slice, inter-prediction processing unit 1220 does not perform inter prediction on the PU. Thus, for blocks encoded in I-mode, the predicted block is formed using spatial prediction from previously-encoded neighboring blocks within the same frame. If a PU is in a P slice, inter-prediction processing unit 1220 may use uni-directional inter prediction to generate a predictive block of the PU. If a PU is in a B slice, inter-prediction processing unit 1220 may use uni-directional or bi-directional inter prediction to generate a predictive block of the PU. Inter-prediction processing unit 1220 may apply the techniques for affine motion models as described elsewhere in this disclosure.

Intra-prediction processing unit 1222 may generate predictive data for a PU by performing intra prediction on the PU. The predictive data for the PU may include predictive blocks of the PU and various syntax elements. Intra-prediction processing unit 1222 may perform intra prediction on PUs in I slices, P slices, and B slices.

To perform intra prediction on a PU, intra-prediction processing unit 1222 may use multiple intra prediction modes to generate multiple sets of predictive data for the PU. Intra-prediction processing unit 1222 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 1222 may use various numbers of intra prediction modes, e.g., 33 directional intra prediction modes. In some examples, the number of intra prediction modes may depend on the size of the region associated with the PU.

Prediction processing unit 1200 may select the predictive data for PUs of a CU from among the predictive data generated by inter-prediction processing unit 1220 for the PUs or the predictive data generated by intra-prediction processing unit 1222 for the PUs. In some examples, prediction processing unit 1200 selects the predictive data for the PUs of the CU based on rate/distortion metrics of the sets of predictive data. The predictive blocks of the selected predictive data may be referred to herein as the selected predictive blocks.

Residual generation unit 1202 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 1202 may generate the residual blocks of the CU such that each sample in the residual blocks has a value equal to a difference between a sample in a coding block of the CU and a corresponding sample in a corresponding selected predictive block of a PU of the CU.

Transform processing unit 1204 may perform partition the residual blocks of a CU into transform blocks of TUs of the CU. For instance, transform processing unit 1204 may perform quad-tree partitioning to partition the residual blocks of the CU into transform blocks of TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 1204 may generate transform coefficient blocks for each TU of a CU by applying one or more transforms to the transform blocks of the TU. Transform processing unit 1204 may apply various transforms to a transform block associated with a TU. For example, transform processing unit 1204 may apply a discrete cosine transform (DCT), a directional transform, or a conceptually-similar transform to a transform block. In some examples, transform processing unit 1204 does not apply transforms to a transform block. In such examples, the transform block may be treated as a transform coefficient block.

Quantization unit 1206 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 1206 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 1208 and inverse transform processing unit 1210 may apply inverse quantization and inverse transforms to a coefficient block, respectively, to reconstruct a residual block from the coefficient block. Reconstruction unit 1212 may add the reconstructed residual block to corresponding samples from one or more predictive blocks generated by prediction processing unit 1200 to produce a reconstructed transform block associated with a TU. By reconstructing transform blocks for each TU of a CU in this way, video encoder 20 may reconstruct the coding blocks of the CU.

Filter unit 1214 may perform one or more deblocking operations to reduce blocking artifacts in the coding blocks associated with a CU. Decoded picture buffer 1216 may store the reconstructed coding blocks after filter unit 1214 performs the one or more deblocking operations on the reconstructed coding blocks. Inter-prediction processing unit 1220 may use a reference picture that contains the reconstructed coding blocks to perform inter prediction on PUs of other pictures. In addition, intra-prediction processing unit 1222 may use reconstructed coding blocks in decoded picture buffer 1216 to perform intra prediction on other PUs in the same picture as the CU.

Entropy encoding unit 1218 may receive data from other functional components of video encoder 20. For example, entropy encoding unit 1218 may receive coefficient blocks from quantization unit 1206 and may receive syntax elements from prediction processing unit 1200. Entropy encoding unit 1218 may perform one or more entropy encoding operations on the data to generate entropy-encoded data. For example, entropy encoding unit 1218 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 1218. For instance, the bitstream may include data that represents values of transform coefficients for a CU.

In this manner, video encoder 20 represents an example of a device configured to encode video data and that includes a memory configured to store video data and one or more processing units implemented in circuitry and configured to include, in a syntax structure in a bitstream that includes an encoded representation of the video data, at least one of a first syntax element or a second syntax element. The syntax structure may be one of an SPS, a PPS, a slice header, or a CTU. The first syntax element may indicate whether 4-parameter affine prediction is enabled for blocks corresponding to the syntax structure, and the second syntax element may indicate whether 6-parameter affine prediction is enabled for the blocks corresponding to the syntax structure. The one or more processing units may be configured to set the first syntax element and the second syntax element independently. Based on 4-parameter affine prediction being enabled for a current block of the video data or 6-parameter affine prediction being enabled for the current block, the one or more processing units may be configured to use affine prediction to generate a predictive block for the current block and generate residual data using the predictive block and the current block.

The one or more processing units may be configured to include, in the bitstream, based on either the first syntax element indicating 4-parameter affine prediction is enabled for the blocks or the second syntax element indicating 6-parameter affine prediction is enabled for the blocks, at least one of a third syntax element, a fourth syntax element, and a fifth syntax element. The third syntax element may indicate whether affine merge mode is used with the current block, and the fourth syntax element may indicate whether affine inter mode is used with the current block. The fifth syntax element may indicate whether the current block is encoded with 4-parameter affine prediction or 6-parameter affine prediction.

The one or more processing units may be configured to include, in the bitstream, based on either the first syntax element indicating 4-parameter affine prediction is enabled for the blocks or the second syntax element indicating 6-parameter affine prediction is enabled for the blocks but not both, at least one of the third syntax element and the fourth syntax element, and not the fifth syntax element.

Video encoder 20 also represents an example of a device configured to encode video data including a memory configured to store video data, and one or more processing units implemented in circuitry and configured to determine, based on one or more previously-decoded pictures of the video data, whether an affine prediction mode that uses a particular number of parameters is enabled for blocks in a current picture of the video data; based on the affine prediction being enabled for the blocks of the current picture, use affine prediction to generate a predictive block for a current block of the current picture; and generate residual data using the predictive block and the current block.

The one or more previously-decoded pictures may be in a same temporal layer as the current picture. Each of the one or more previously-decoded pictures may have a same POC mod M value, where M is an integer. To determine whether the affine prediction mode is enabled for the block in the current picture, the one or more processing units may be configured to determine, based on an area of blocks in the one or more previously-decoded pictures that are encoded with the affine prediction mode, whether the affine prediction mode is enabled for the blocks of the current picture. The area of blocks in the one or more previously-decoded pictures that are encoded with the affine prediction mode may include areas of blocks in the previously-decoded pictures that are encoded with the affine prediction mode in affine inter mode and affine merge mode. The one or more processing units may be configured to reset a variable indicating the area of the blocks in response to reaching an end of a GOP.

Video encoder 20 also represents an example of a device configured to encode video data and that includes a memory configured to store video data and one or more processing units implemented in circuitry and configured to derive, based on a motion vector of a top-left control point of a current block of the video data and a motion vector of a top-right control point of the current block, a motion vector for a bottom-left control point of the current block; use the motion vectors of the top-left, top-right, and bottom-left control points of the current block to generate a predictive block; and generate residual data based on the predictive block and the current block.

Video encoder 20 also represents an example of a device configured to encode video data including a memory configured to store video data, and one or more processing units implemented in circuitry and configured to include, in a syntax structure in a bitstream that includes an encoded representation of the video data, at least one of a first syntax element or a second syntax element. The first syntax element may indicate whether 4-parameter affine prediction is enabled for blocks corresponding to the syntax structure, and the second syntax element may indicate whether 6-parameter affine prediction is enabled for the blocks corresponding to the syntax structure. Based on 4-parameter affine prediction being enabled for a current block of the video data or 6-parameter affine prediction being enabled for the current block, the one or more processing units may be configured to use affine prediction to generate a predictive block for the current block and generate residual data using the predictive block and the current block.

Video encoder 20 also represents an example of a device configured to encode video data including a memory configured to store video data, and one or more processing units implemented in circuitry and configured to determine a first motion vector for a top-left control point of a current block of a current picture of the video data and a second motion vector for a top-right control point of the current block by performing motion estimation for 4-parameter affine prediction of the current block; derive, based on the first motion vector and the second motion vector, a third motion vector for a bottom-left control point of the current block; use the first motion vector, second motion vector, and the third motion vector as a seed motion candidate for performing motion estimation for 6-parameter affine prediction of the current block; use the 6-parameter affine prediction to generate a predictive block; and generate residual data based on the predictive block and the current block.

Video encoder 20 also represents an example of a device configured to encode video data including a memory configured to store video data, and one or more processing units implemented in circuitry and configured to determine a first motion vector, a second motion vector, and a third motion vector by performing motion estimation for 6-parameter affine prediction of a current block of a current picture of the video data, the first motion vector being a motion vector for a top-left control point of the current block, the second motion vector being a motion vector for a top-right control point of the current block, and the third motion vector being a motion vector for a bottom-left control point of the current block; use the first motion vector and the second motion vector as a seed motion candidate for performing motion estimation for 4-parameter affine prediction of the current block; use the 4-parameter affine prediction to generate a predictive block; and generate residual data based on the predictive block and the current block.

Video encoder 20 also represents an example of a device configured to encode video data including a memory configured to store video data, and one or more processing units implemented in circuitry and configured to use, as a candidate seed motion for performing motion estimation for affine prediction of a current block of a current picture of the video data, motion vectors for control points of a parent block of a current block of the video data; use the affine prediction to generate a predictive block; and generate residual data based on the predictive block and the current block.

Video encoder 20 also represents an example of a device configured to encode video data including a memory configured to store video data, and one or more processing units implemented in circuitry and configured to determine that the bitstream does not conform to the video coding standard in response to determining at least one of a motion vector of a first control point of an affine-coded block of a current picture of the video data is equal to a motion vector of a second control point of the block or a difference between a motion vector of the first control point and the second control point is less than a predetermined threshold value.

Video encoder 20 also represents an example of a device configured to encode video data including a memory configured to store video data, and one or more processing units implemented in circuitry and configured to determine that a metric of a difference between control point motion vector predictors of a current block of the video data is greater than a predetermined threshold; include, in a bitstream that that includes an encoded representation of the video data, based on the metric being greater than the predetermined threshold, a syntax element indicating whether motion vectors of control points of the current block are signaled using an affine inter mode; and based on the motion vectors of the control points of the current block being signaled using the affine inter mode, signal, in the bitstream, the motion vectors of the control points of the current block using the affine inter mode.

Video encoder 20 also represents an example of a device configured to encode video data including a memory configured to store video data, and one or more processing units implemented in circuitry and configured to adaptively select, based on a cost calculated from a predetermined criterion, two control points from among a top-left control point of a current block, a top-right control point of the current block, and a bottom-left control point of the current block, the current block being in a current picture of the video data; use motion vectors of the two selected control points in a 4-parameter affine motion model to generate a predictive block for the current block; and generate residual data based on the predictive block and the current block.

Figure 12:
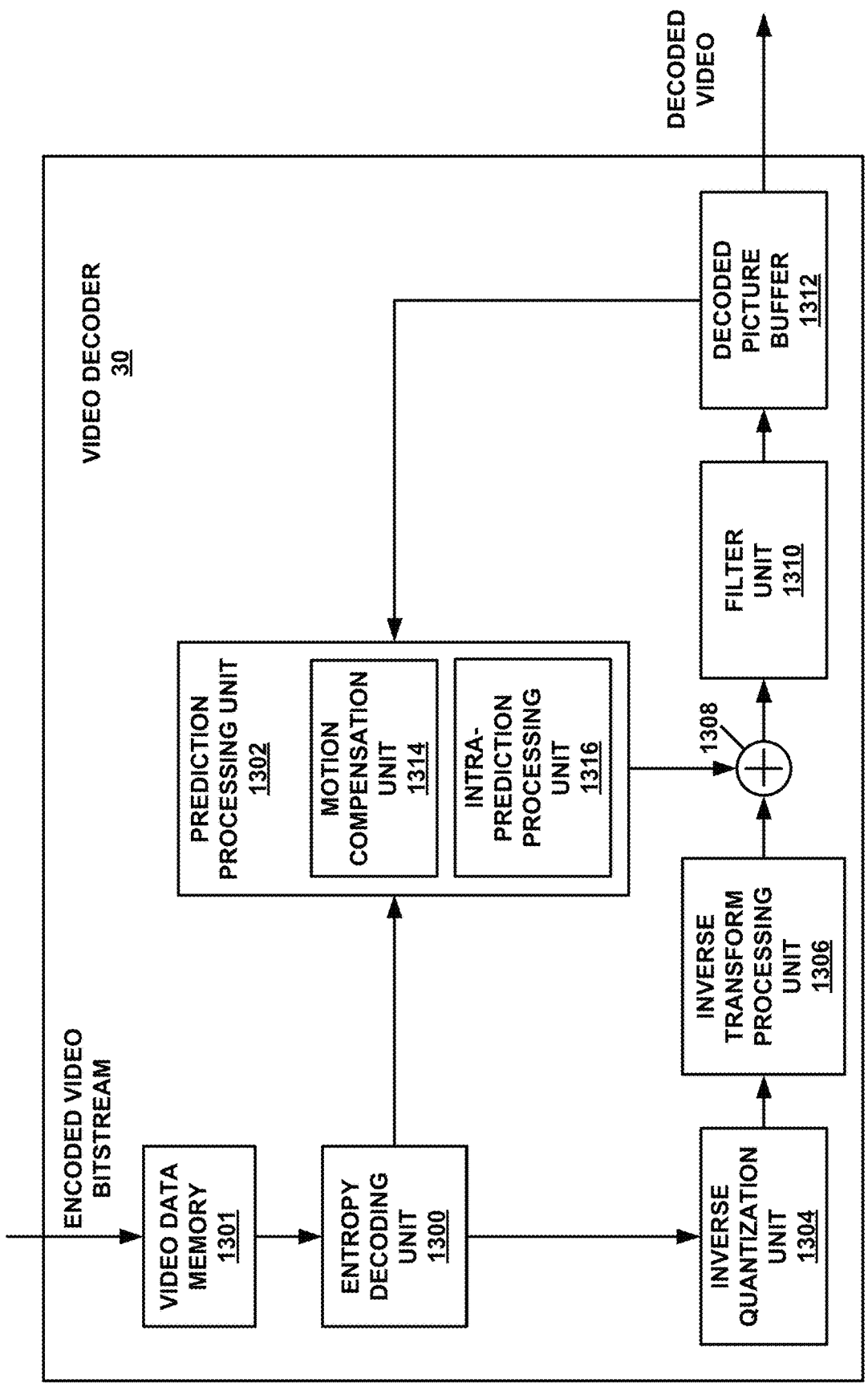
FIG. 12 is a block diagram illustrating an example video decoder that may implement one or more techniques described in this disclosure.

FIG. 12 is a block diagram illustrating an example video decoder 30 that is configured to implement the techniques of this disclosure. FIG. 12 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 12, video decoder 30 includes an entropy decoding unit 1300, video data memory 1301, a prediction processing unit 1302, an inverse quantization unit 1304, an inverse transform processing unit 1306, a reconstruction unit 1308, a filter unit 1310, and a decoded picture buffer 1312. Prediction processing unit 1302 includes a motion compensation unit 1314 and an intra-prediction processing unit 1316. In other examples, video decoder 30 may include more, fewer, or different functional components.

Video data memory 1301 may store encoded video data, such as an encoded video bitstream, to be decoded by the components of video decoder 30. The video data stored in video data memory 1301 may be obtained, for example, from computer-readable medium 16, e.g., from a local video source, such as a camera, via wired or wireless network communication of video data, or by accessing physical data storage media. Video data memory 1301 may form a coded picture buffer (CPB) that stores encoded video data from an encoded video bitstream. Decoded picture buffer 1312 may be a reference picture memory that stores reference video data for use in decoding video data by video decoder 30, e.g., in intra- or inter-coding modes, or for output. Video data memory 1301 and decoded picture buffer 1312 may be formed by any of a variety of memory devices, such as DRAM, including SDRAM, MRAM, RRAM, or other types of memory devices. Video data memory 1301 and decoded picture buffer 1312 may be provided by the same memory device or separate memory devices. In various examples, video data memory 1301 may be on-chip with other components of video decoder 30, or off-chip relative to those components. Video data memory 1301 may be the same as or part of storage media 28 of FIG. 1.

Video data memory 1301 receives and stores encoded video data (e.g., NAL units) of a bitstream. Entropy decoding unit 1300 may receive encoded video data (e.g., NAL units) from video data memory 1301 and may parse the NAL units to obtain syntax elements. Entropy decoding unit 1300 may entropy decode entropy-encoded syntax elements in the NAL units. Prediction processing unit 1302, inverse quantization unit 1304, inverse transform processing unit 1306, reconstruction unit 1308, and filter unit 1310 may generate decoded video data based on the syntax elements extracted from the bitstream. Entropy decoding unit 1300 may perform a process generally reciprocal to that of entropy encoding unit 1218.

In addition to obtaining syntax elements from the bitstream, video decoder 30 may perform a reconstruction operation on a CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 1304 may inverse quantize, i.e., de-quantize, coefficient blocks associated with the TU. After inverse quantization unit 1304 inverse quantizes a coefficient block, inverse transform processing unit 1306 may apply one or more inverse transforms to the coefficient block in order to generate a residual block associated with the TU. For example, inverse transform processing unit 1306 may apply an inverse DCT, an inverse integer transform, an inverse Karhunen-Loeve transform (KLT), an inverse rotational transform, an inverse directional transform, or another inverse transform to the coefficient block.

Inverse quantization unit 1304 may perform particular techniques of this disclosure. For example, for at least one respective quantization group of a plurality of quantization groups within a CTB of a CTU of a picture of the video data, inverse quantization unit 1304 may derive, based at least in part on local quantization information signaled in the bitstream, a respective quantization parameter for the respective quantization group. Additionally, in this example, inverse quantization unit 1304 may inverse quantize, based on the respective quantization parameter for the respective quantization group, at least one transform coefficient of a transform block of a TU of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video decoder 30 (e.g., inverse transform processing unit 1306, reconstruction unit 1308, and filter unit 1310) may reconstruct, based on inverse quantized transform coefficients of the transform block, a coding block of the CU.

If a PU is encoded using intra prediction, intra-prediction processing unit 1316 may perform intra prediction to generate predictive blocks of the PU. Intra-prediction processing unit 1316 may use an intra prediction mode to generate the predictive blocks of the PU based on samples spatially-neighboring blocks. Intra-prediction processing unit 1316 may determine the intra prediction mode for the PU based on one or more syntax elements obtained from the bitstream.

If a PU is encoded using inter prediction, motion compensation unit 1314 may determine motion information for the PU. Motion compensation unit 1314 may determine, based on the motion information of the PU, one or more reference blocks. Motion compensation unit 1314 may generate, based on the one or more reference blocks, predictive blocks (e.g., predictive luma, Cb and Cr blocks) for the PU.

Motion compensation unit 1314 may apply the techniques for affine motion models as described elsewhere in this disclosure.

Reconstruction unit 1308 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 1308 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 1310 may perform a deblocking operation to reduce blocking artifacts associated with the coding blocks of the CU. Video decoder 30 may store the coding blocks of the CU in decoded picture buffer 1312. Decoded picture buffer 1312 may provide reference pictures for subsequent motion compensation, intra prediction, and presentation on a display device, such as display device 32 of FIG. 1. For instance, video decoder 30 may perform, based on the blocks in decoded picture buffer 1312, intra prediction or inter prediction operations for PUs of other CUs.

In this manner, video decoder 30 represents an example of a video decoding device that includes a memory configured to store video data and one or more processing units implemented in circuitry and configured to obtain, from a syntax structure in a bitstream that includes an encoded representation of the video data, at least one of a first syntax element or a second syntax element. The first syntax element indicates whether 4-parameter affine prediction is enabled for blocks corresponding to the syntax structure, and the second syntax element indicates whether 6-parameter affine prediction is enabled for the blocks corresponding to the syntax structure. Based on the first syntax element indicating that 4-parameter affine prediction is enabled for a current block of the video data or the second syntax element indicating that 6-parameter affine prediction is enabled for the current block, the one or more processing units may use affine prediction to generate a predictive block for the current block and use the predictive block and residual data to reconstruct the current block. The syntax structure may, for example, be one of an SPS, a PPS, a slice header, or a CTU. The first syntax element and the second syntax element may be set independently.

The one or more processing units may also be configured to obtain, from the bitstream, based on either the first syntax element indicating 4-parameter affine prediction is enabled for the blocks or the second syntax element indicating 6-parameter affine prediction is enabled for the blocks, at least one of a third syntax element, a fourth syntax element, and a fifth syntax element. The third syntax element may indicate whether affine merge mode is used with the current block, and the fourth syntax element may indicate whether affine inter mode is used with the current block. The fifth syntax element may indicate whether the current block is encoded with 4-parameter affine prediction or 6-parameter affine prediction. The one or more processing units may also be configured to obtain, from the bitstream, based on either the first syntax element indicating 4-parameter affine prediction is enabled for the blocks or the second syntax element indicating 6-parameter affine prediction is enabled for the blocks but not both, at least one of the third syntax element and the fourth syntax element, and not the fifth syntax element.

Video decoder 30 also represents an example of a video decoding device that includes a memory configured to store video data and one or more processing units implemented in circuitry and configured to determine, based on one or more previously-decoded pictures of the video data, whether an affine prediction mode that uses a particular number of parameters is enabled for blocks in a current picture of the video data; based on the affine prediction being enabled for the blocks of the current picture, use affine prediction to generate a predictive block for a current block of the current picture; and use the predictive block and residual data to reconstruct the current block. The one or more previously-decoded pictures may be in a same temporal layer as the current picture. Each of the one or more previously-decoded pictures may have a same POC mod M value, where M is an integer.

To determine whether the affine prediction mode is enabled for the block in the current picture, the one or more processing units may be configured to determine, based on an area of blocks in the one or more previously-decoded pictures that are encoded with the affine prediction mode, whether the affine prediction mode is enabled for the blocks of the current picture. The area of blocks in the one or more previously-decoded pictures that are encoded with the affine prediction mode may include areas of blocks in the previously-decoded pictures that are encoded with the affine prediction mode in affine inter mode and affine merge mode. The one or more processing units may also be configured to reset a variable indicating the area of the blocks in response to reaching an end of a GOP.

Video decoder 30 also represents an example of a video decoding device that includes a memory configured to store video data and one or more processing units implemented in circuitry and configured to derive, based on a motion vector of a top-left control point of a current block of the video data and a motion vector of a top-right control point of the current block, a motion vector for a bottom-left control point of the current block; use the motion vectors of the top-left, top-right, and bottom-left control points of the current block to generate a predictive block; and reconstruct the current block based on the predictive block and residual data.

Video decoder 30 represents an example of a video decoding device that includes a memory configured to store video data and one or more processing units implemented in circuitry and configured to obtain, from a syntax structure in a bitstream that includes an encoded representation of the video data, at least one of a first syntax element or a second syntax element. The first syntax element indicates whether 4-parameter affine prediction is enabled for blocks corresponding to the syntax structure, and the second syntax element indicates whether 6-parameter affine prediction is enabled for the blocks corresponding to the syntax structure. Based on the first syntax element indicating that 4-parameter affine prediction is enabled for a current block of the video data or the second syntax element indicating that 6-parameter affine prediction is enabled for the current block, the one or more processing units are configured to use affine prediction to generate a predictive block for the current block and use the predictive block and residual data to reconstruct the current block.

Figure 13:
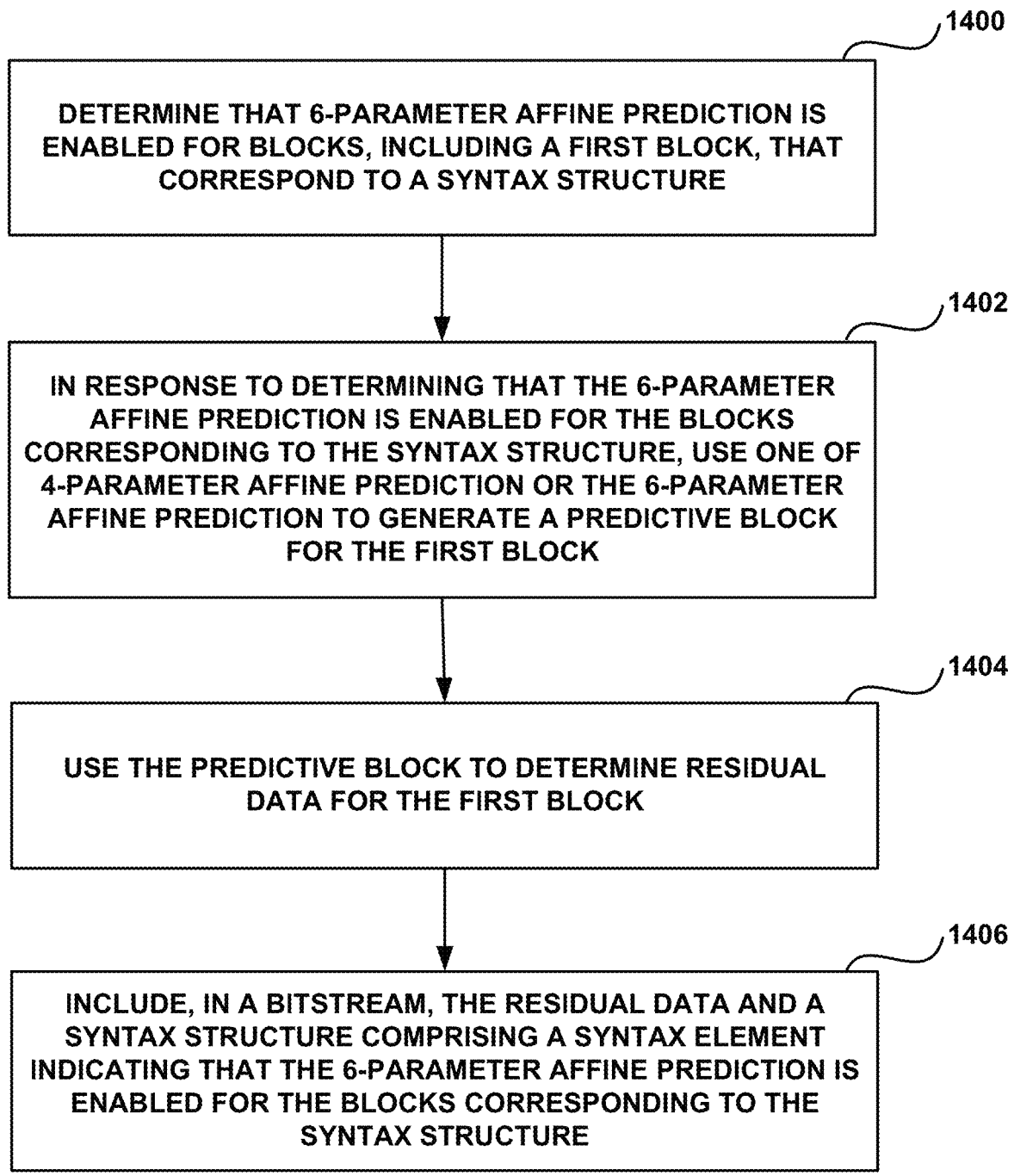
FIG. 13 is a flowchart illustrating an example video encoding process.

FIG. 13 is a flowchart illustrating an example video encoding process. Video encoder 20, including inter-prediction unit 1220 and entropy encoding unit 1218, may be configured to perform the techniques of FIG. 13. In one example of the disclosure, video encoder 20 may be configured to determine that 6-parameter affine prediction is enabled for blocks, including a first block, that correspond to a syntax structure (1400). In response to determining that the 6-parameter affine prediction is enabled for the blocks corresponding to the syntax structure, video encoder 20 may be configured to use one of 4-parameter affine prediction or the 6-parameter affine prediction to generate a predictive block for the first block (1402). Video encoder 20 may use the predictive block to determine residual data for the first block (1404) and include, in a bitstream, the residual data and a syntax structure comprising a syntax element indicating that the 6-parameter affine prediction is enabled for the blocks corresponding to the syntax structure (1406). The syntax structure may, for example, be a sequence parameter set.

Video encoder 20 may be configured to, in response the 6-parameter affine prediction being enabled for the blocks corresponding to the syntax structure, include in the bitstream a second syntax element indicating whether the first block is encoded with 4-parameter affine prediction or 6-parameter affine prediction. The second syntax element may, for example, be part of the syntax structure or may be a block-level syntax element that is not part of the syntax structure.

Figure 14:
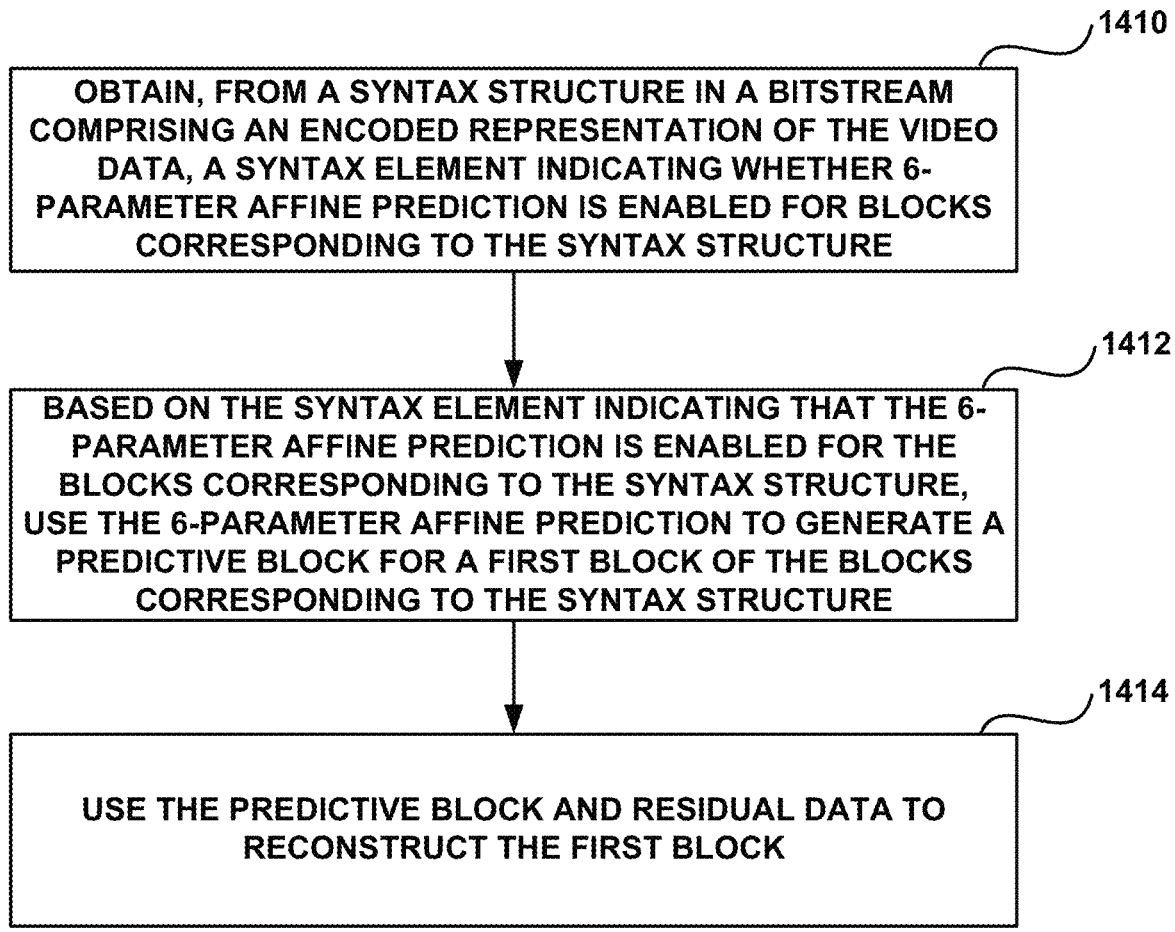
FIG. 14 is a flowchart illustrating an example video decoding process.

FIG. 14 is a flowchart illustrating an example video decoding process. Video decoder 30, including entropy decoding unit 1300 and motion compensation unit 1314, may be configured to perform the techniques of FIG. 14. In one example of the disclosure, video decoder 30 may be configured to obtain, from a syntax structure in a bitstream comprising an encoded representation of the video data, a syntax element indicating whether 6-parameter affine prediction is enabled for blocks corresponding to the syntax structure (1410). Based on the syntax element indicating that the 6-parameter affine prediction is enabled for the blocks corresponding to the syntax structure, video decoder 30 may use the 6-parameter affine prediction to generate a predictive block for a first block of the blocks corresponding to the syntax structure (1412). Video decoder 30 may use the predictive block and residual data to reconstruct the first block (1414). The syntax structure may, for example, be a sequence parameter set.

In some examples, in response to the syntax element indicating that 6-parameter affine prediction is enabled for the blocks corresponding to the syntax structure, video decoder 30 may be configured to obtain from the bitstream, a second syntax element indicating whether the first block is encoded with 4-parameter affine prediction or 6-parameter affine prediction. The second syntax element may, for example, be part of the syntax structure or may be a block-level syntax element that is not part of the syntax structure.

The blocks corresponding to the syntax structure may include a second block, and video decoder 30 may be configured to, in response to the syntax element indicating that 6-parameter affine prediction is enabled for the blocks corresponding to the syntax structure, obtain, from the bitstream, a second syntax element indicating whether the second block is encoded with 4-parameter affine prediction or 6-parameter affine prediction. Based on the second syntax element indicating that the second block is encoded with 4-parameter affine prediction, video decoder 30 may use the 4-parameter affine prediction to generate a second predictive block for the second block and use the second predictive block and second residual data to reconstruct the second block.

In some examples, video decoder 30 may be configured to obtain, from the syntax structure in the bitstream, a syntax element indicating whether 4-parameter affine prediction is enabled for the blocks corresponding to the syntax structure and, based on the syntax element indicating that 4-parameter affine prediction is disabled for the blocks corresponding to the syntax structure, use 6-parameter affine prediction to generate the predictive block for the first block.

Certain aspects of this disclosure have been described with respect to extensions of the HEVC standard for purposes of illustration. However, the techniques described in this disclosure may be useful for other video coding processes, including other standard or proprietary video coding processes presently under development or not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can be any one or more of RAM, ROM, EEPROM, CD-ROM, or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium.

For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

obtaining, from a syntax structure in a bitstream comprising an encoded representation of the video data, an instance of a first syntax element, wherein a first value for the first syntax element indicates that 6-parameter affine prediction is enabled for a plurality of blocks corresponding to the syntax structure and a second value for the first syntax element indicates that the 6-parameter affine prediction is disabled for the plurality of blocks corresponding to the syntax structure, wherein the plurality of blocks corresponding to the syntax structure comprise a first block and a second block;

in response to the instance of the first syntax element indicating that the 6-parameter affine prediction is enabled for the plurality of blocks corresponding to the syntax structure, obtaining from the bitstream, a first instance of a second syntax element, wherein the second syntax element indicates whether the first block is encoded with 4-parameter affine prediction or the 6-parameter affine prediction, wherein a value for the first instance of the second syntax element indicates that the first block is encoded with the 4-parameter affine prediction, wherein the second syntax element comprises a block-level syntax element separate from the syntax structure;

based on the instance of the first syntax element indicating that the 6-parameter affine prediction is enabled for the plurality of blocks corresponding to the syntax structure and based on the value for the first instance of the second syntax element indicating that the first block is encoded with the 4-parameter affine prediction, using the 4-parameter affine prediction without the 6-parameter affine prediction to generate a first predictive block for the first block, wherein using the 4-parameter affine prediction without the 6-parameter affine prediction to generate the first predictive block for the first block comprises using only two control point motion vectors to determine the first predictive block; and using the first predictive block and first residual data to determine a first reconstructed block;

in response to the instance of the first syntax element indicating that the 6-parameter affine prediction is enabled for the plurality of blocks corresponding to the syntax structure, obtaining, from the bitstream, a second instance of the second syntax element indicating whether the second block is encoded with the 4-parameter affine prediction or the 6-parameter affine prediction, wherein a value for the second instance of the second syntax element indicates that the second block is encoded with the 6-parameter affine prediction;

based on the second instance of the second syntax element indicating that the second block is encoded with the 6-parameter affine prediction, using the 6-parameter affine prediction without the 4-parameter affine prediction to generate a second predictive block for the second block, wherein using the 6-parameter affine prediction without the 4-parameter affine prediction to generate the second predictive block for the second block comprises using three control point motion vectors to determine the second predictive block;

using the second predictive block and second residual data to determine a second reconstructed block; and outputting a picture of decoded video data based on the first reconstructed block and the second reconstructed block.

2. The method of claim 1, wherein the syntax structure comprises a sequence parameter set.

3. The method of claim 1, wherein the first syntax element comprises a 1-bit flag.

4. The method of claim 1, wherein using the first predictive block and the first residual data to determine the first reconstructed block comprises adding the first predictive block to a residual block, the method further comprising:

performing one or more filtering operations on the first reconstructed block to determine a final block; and outputting the picture of decoded video data comprising the final block.

5. A device for decoding video data, the device comprising:
a memory configured to store video data; and
one or more processors coupled to the memory, implemented in processing circuitry, and configured to:
obtain, from a syntax structure in a bitstream comprising an encoded representation of the video data, an instance of a first syntax element, wherein a first value for the first syntax element indicates that 6-parameter affine prediction is enabled for a plurality of blocks corresponding to the syntax structure and a second value for the first syntax element indicates that the 6-parameter affine prediction is disabled for the plurality of blocks corresponding to the syntax structure, wherein the plurality of blocks corresponding to the syntax structure comprise a first block and a second block;
in response to the instance of the first syntax element indicating that the 6-parameter affine prediction is enabled for the plurality of blocks corresponding to the syntax structure, obtain from the bitstream, a first instance of a second syntax element, wherein the second syntax element indicates whether the first block is encoded with 4-parameter affine prediction or the 6-parameter affine prediction, wherein a value for the first instance of the second syntax element indicates that the first block is encoded with the 4-parameter affine prediction, wherein the second syntax element comprises a block-level syntax element separate from the syntax structure;
based on the instance of the first syntax element indicating that the 6-parameter affine prediction is enabled for the plurality of blocks corresponding to the syntax structure and based on the value for the first instance of the second syntax element indicating that the first block is encoded with the 4-parameter affine prediction, use the 4-parameter affine prediction without the 6-parameter affine prediction to generate a first predictive block for the first block, wherein to use the 4-parameter affine prediction without the 6-parameter affine prediction to generate the first predictive block for the first block, the one or more processors are further configured to use only two control point motion vectors to determine the first predictive block; and
use the first predictive block and first residual data to reconstruct the first block determine a first reconstructed block;
in response to the instance of the first syntax element indicating that the 6-parameter affine prediction is enabled for the plurality of blocks corresponding to the syntax structure, obtain, from the bitstream, a second instance of the second syntax element indicating whether the second block is encoded with the 4-parameter affine prediction or the 6-parameter affine prediction, wherein a value for the second instance of the second syntax element indicates that the second block is encoded with the 6-parameter affine prediction;
based on the second instance of the second syntax element indicating that the second block is encoded with the 6-parameter affine prediction, use the 6-parameter affine prediction without the 4-parameter affine prediction to generate a second predictive block for the second block, wherein using the 6-parameter affine prediction without the 4-parameter affine prediction to generate the second predictive block for the second block comprises using three control point motion vectors to determine the second predictive block;
use the second predictive block and second residual data to determine a second reconstructed block; and
output a picture of decoded video data based on the first reconstructed block and the second reconstructed block.

6. The device of claim 5, wherein the syntax structure comprises a sequence parameter set.

7. The device of claim 5, wherein the first syntax element comprises a 1-bit flag.

8. The device of claim 5, wherein to use the first predictive block and the first residual data to determine the first reconstructed block, the one or more processors are configured to add the first predictive block to a residual block, wherein the one or more processors are further configured to:
perform one or more filtering operations on the first reconstructed block to determine a final block; and
output the picture of decoded video data comprising the final block.

9. The device of claim 5, further comprising a display configured to display decoded video data.

10. The device of claim 5, wherein the device comprises one or more of a cellular phone, a camera, a computer, a mobile device, a broadcast receiver device, or a set-top box.

11. A device for encoding video data, the device comprising:
a memory configured to store video data; and
one or more processors coupled to the memory, implemented in processing circuitry, and configured to:
determine that 6-parameter affine prediction is enabled for a plurality of blocks corresponding to a syntax structure, wherein the plurality of blocks corresponding to the syntax structure comprise a first block and a second block;
use 4-parameter affine prediction to determine a first predictive block for the first block, wherein using the 4-parameter affine prediction to generate the first predictive block for the first block comprises using only two control point motion vectors to determine the first predictive block;
use the first predictive block to determine residual data for the first block;
use the 6-parameter affine prediction to determine a second predictive block for the second block, wherein using the 6-parameter affine prediction to generate the second predictive block for the second block comprises using only three control point motion vectors to determine the second predictive block;
use the second predictive block to determine residual data for the second block;
include, in a bitstream, the residual data for the first block, the residual data for the second block, and a syntax structure comprising an instance of a first syntax element set to a first value indicating that the 6-parameter affine prediction is enabled for the plurality of blocks corresponding to the syntax structure, wherein a second value for the first syntax element indicates that the 6-parameter affine prediction is disabled for the plurality of blocks corresponding to the syntax structure;
in response to the 6-parameter affine prediction being enabled for the plurality of blocks corresponding to the syntax structure, include in the bitstream a first instance of a second syntax element indicating whether the first block is encoded with the 4-parameter affine prediction or the 6-parameter affine prediction, wherein a value for the first instance of the second syntax element indicates that the first block is encoded with the 4-parameter affine prediction without the 6-parameter affine prediction, wherein the second syntax element comprises a block-level syntax element separate from the syntax structure;

in response to the 6-parameter affine prediction being enabled for the plurality of blocks corresponding to the syntax structure, including in the bitstream a second instance of the second syntax element indicating whether the second block is encoded with the 4-parameter affine prediction or the 6-parameter affine prediction, wherein a value for the second instance of the second syntax element indicates that the first block is encoded with the 6-parameter affine prediction without the 4-parameter affine prediction.

12. The device of claim 11, wherein the syntax structure comprises a sequence parameter set.

13. The device of claim 11, wherein the device comprises a cellular phone.

* * * * *